(12) United States Patent
Trinch et al.

(10) Patent No.: US 10,233,023 B1
(45) Date of Patent: Mar. 19, 2019

(54) CONVEYOR BELT SPIRAL OVERLAY HAVING INTERMEDIATE LOOPS

(71) Applicant: Ashworth Bros., Inc., Fall River, MA (US)

(72) Inventors: Chris Trinch, Stephenson, VA (US); Jonathan R. Lasecki, Bunker Hill, WV (US); William Banks, Jr., Stephens City, VA (US)

(73) Assignee: Ashworth Bros., Inc., Fall River, MA (US)

( * ) Notice: Subject to any disclaimer, the term of this patent is extended or adjusted under 35 U.S.C. 154(b) by 0 days.

(21) Appl. No.: 15/705,792

(22) Filed: Sep. 15, 2017

(51) Int. Cl.
*B65G 15/54* (2006.01)
*B65G 17/06* (2006.01)

(52) U.S. Cl.
CPC .......... *B65G 17/064* (2013.01); *B65G 15/54* (2013.01)

(58) Field of Classification Search
CPC ............................. B65G 17/064; B65G 15/54
USPC ................................................ 198/778, 848
See application file for complete search history.

(56) References Cited

U.S. PATENT DOCUMENTS

| | | | |
|---|---|---|---|
| 2,234,247 A | 3/1941 | Guba | |
| 2,370,954 A | 3/1945 | Guba | |
| 3,794,155 A * | 2/1974 | Bechtel, Jr. ............ | B65G 17/06 198/848 |
| 4,440,367 A * | 4/1984 | Daringer ................. | B21F 27/04 245/6 |
| 5,141,099 A * | 8/1992 | Baumgartner ......... | B65G 15/54 198/778 |
| 5,423,416 A * | 6/1995 | Kucharski ............ | B65G 17/064 198/690.2 |
| 5,558,208 A | 9/1996 | Kucharski | |
| 5,829,578 A * | 11/1998 | Froderberg .......... | B65G 17/064 198/848 |

(Continued)

FOREIGN PATENT DOCUMENTS

| | | |
|---|---|---|
| DE | 3221255 C2 | 12/1983 |
| DE | 19857937 A1 | 6/2000 |
| GB | 333751 A | 8/1930 |

OTHER PUBLICATIONS

Images of conveyor belt produced by JBT Corporation under the Frigoscandia brand, commercialization and/or public disclosure of this product is believed to predate Sep. 15, 2017 (precise date unknown). (16pp).

*Primary Examiner* — Douglas A Hess
(74) *Attorney, Agent, or Firm* — Plumsea Law Group, LLC

(57) ABSTRACT

A spiral overlay for a conveyor belt includes a plurality of wire spirals assembled together in intermeshing relationship on connecting rods to provide a conveying surface and an opposing surface with a belt thickness extending in the vertical direction. Each of said wire spirals formed of a single length of wire and forming a helix extending laterally across the belt, said spiral comprising opposed arcuate linking bends at a forward end and a rearward end along the longitudinal axis, and at least one intermediate loop formed between said opposed arcuate linking bends and disposed within the belt thickness, said spirals arranged relative to one another such that said linking bends of one spiral are intermeshed with linking bends of an immediately adjacent one of said spirals and said intermeshed linking bends of adjacent spirals are adapted to receive one of the connecting rods to operatively connect said spirals.

36 Claims, 25 Drawing Sheets

(56) References Cited

U.S. PATENT DOCUMENTS

| | | | | |
|---|---|---|---|---|
| 6,070,715 A | * | 6/2000 | Etherington | B65G 17/063 198/848 |
| 6,129,205 A | * | 10/2000 | Ergenbright | B65G 17/064 198/852 |
| 7,278,534 B2 | * | 10/2007 | Record | B65G 15/54 198/848 |
| 7,591,928 B2 | * | 9/2009 | Billings | D21F 1/0072 162/348 |
| 8,973,743 B2 | * | 3/2015 | Farrell | B65G 15/54 198/848 |

* cited by examiner

CONVEYOR BELT SPIRAL OVERLAY HAVING INTERMEDIATE LOOPS

BACKGROUND OF THE INVENTION

1. Field of the Invention

The present disclosure is directed to conveyor belts and, more specifically, to conveyor belt spiral overlay having intermediate loops.

2. Description of Related Art

Some conveyor belts utilize a wire mesh with components of the wire mesh operatively connected to one another by connecting rods that extend laterally across the belt. Such wire meshes provide a distributed conveying surface for supporting articles to be carried by the conveyor belt, while maintaining a reduced weight of the belt. Such meshes also permit ventilation through the conveying surface. In addition, such meshes may enable an article to be completely dipped into a solution while placed on the belt.

There are conflicting performance characteristics of such designs. For example, a more densely arranged wire mesh may be used in order to maximize the surface area of the conveying surface, however, more densely arranged wire meshes also increase the contacting surface area between the wires of the mesh and the connecting rods, which provides increased binding, decreased flexibility, and increased wear. Therefore, it would be desirable to provide a wire mesh that is less densely arranged but which substantially maintains the same or similar amount of surface area for the conveying surface.

In addition, turn curve belts are configured to collapse in the longitudinal direction on one or both sides of the belt. In particular, when navigating a curve, the belt shortens on one side by the connecting rods sliding within the slots in the end links. If the belt collapses too far, buckling of the belt can occur. For tighter turns, it would be desirable to provide a turn curve belt with a configuration that limits the amount to which the belt may collapse on one or both sides.

SUMMARY OF THE INVENTION

The present disclosure is directed to a spiral overlay that decreases the amount of contact surface area between the spiral overlay and the connecting rods, while substantially maintaining or increasing the amount of supporting area of the conveying surface. In particular, the disclosed spiral overlay includes an intermediate loop located between the connecting rods of the belt. The intermediate loops are confined to the area including and between the conveying surface of the belt and the opposing surface of the belt. In particular, the intermediate loop includes its uppermost portion disposed in the plane of the conveying surface of the belt.

In addition, each intermediate loop provides a discontinuity in the conveying surface, thereby spreading the supporting portions of the spiral overlay out laterally. This also has the effect of reducing the number of contact points between the spiral overlay and the connecting rods. Thus, even though there are fewer spirals contacting the connecting rods, the amount of surface area provided for the conveying surface is substantially the same or greater than it would be without the intermediate loops. In some embodiments, the amount of conveying surface area may be slightly less than it would be without the intermediate loops, but the conveying surface area may be distributed more evenly, such that the belt can support the desired articles even with less conveying surface area.

An additional benefit of the intermediate loops is that the loops prevent the edges of the belt from collapsing in the longitudinal direction more than a predetermined amount. In particular, when navigating a curve, the belt shortens on one side by the connecting rods sliding closer to one another at that side of the belt. Because the intermediate loops are disposed between the conveying surface and the opposing surface of the belt, the intermediate loops maintain spacing between the connecting rods by at least a distance equivalent to the diameter of the intermediate loops.

In one aspect, the present disclosure is directed to a spiral overlay for a conveyor belt having a lateral axis extending across the belt and defining a lateral direction, a longitudinal axis extending along a conveying direction of the belt, and a vertical axis perpendicular to the lateral axis and the longitudinal axis, the vertical axis defining a vertical direction, the conveyor belt formed of a plurality of connecting rods extending laterally across the belt. The overlay includes a plurality of wire spirals assembled together in intermeshing relationship to one another on the connecting rods to provide a conveying surface and an opposing surface with a belt thickness extending in the vertical direction. Each of said wire spirals formed of a single length of wire and forming a helix extending laterally across the belt, said spiral comprising opposed arcuate linking bends at a forward end and a rearward end along the longitudinal axis, and at least one intermediate loop formed between said opposed arcuate linking bends and disposed within the belt thickness, said spirals arranged relative to one another such that said linking bends of one spiral are intermeshed with linking bends of an immediately adjacent one of said spirals and said intermeshed linking bends of adjacent spirals are adapted to receive one of the connecting rods to operatively connect said spirals.

In another aspect, the present disclosure is directed to a spiral overlay for a conveyor belt formed of a plurality of connecting rods extending laterally across the belt, the belt having a conveying surface and an opposing surface. The spiral overlay includes a plurality of wire spirals, each formed of a single length of wire and forming a helix configured to extend across the belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals adapted to receive one of the rods to operatively connect said spirals. The plurality of wire spirals are configured in a first plane to define the conveying surface of the belt and configured in a second plane to define the opposing surface of the belt substantially parallel to the first plane, wherein the distance between the first plane and the second plane defines a vertical thickness of the spiral overlay. Also, a belt space includes the first plane, the second plane, and the space between the first plane and the second plane, at least one wire forming the spiral overlay includes an intermediate loop between the opposed arcuate linking bends, and the entire intermediate loop is disposed within the belt space.

In another aspect, the present disclosure is directed to a conveyor belt having a lateral axis extending across the belt and defining a lateral direction, a longitudinal axis in a conveying direction of the belt, and a vertical axis perpendicular to the lateral axis and the longitudinal axis and defining a vertical direction. The conveyor belt includes a plurality of connecting rods extending laterally across the belt and a spiral overlay including a plurality of wire spirals, each formed of a single length of wire and forming a helix extending across the belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals adapted to receive one of the rods to operatively connect said spirals. The plurality of wire spirals define a conveying surface and an opposing surface of the belt, wherein the conveying surface extends in a first plane and the opposing surface extends in a second plane substantially parallel to the first plane, wherein the distance between the first plane and the second plane defines a thickness of the spiral overlay. In addition, at least one wire forming the spiral overlay includes an intermediate loop between two of the opposed arcuate linking bends. The intermediate loop is coiled about a central axis that is substantially parallel to the first plane, wherein the intermediate loop has a first edge and an opposing second edge oriented opposite one another in the vertical direction. In addition, wherein the first edge of the intermediate loop is disposed in the first plane.

In another aspect, the present disclosure is directed to a spiral overlay for a conveyor belt having a lateral axis extending across the belt and defining a lateral direction, a longitudinal axis in a conveying direction of the belt, and a vertical axis perpendicular to the lateral axis and the longitudinal axis and defining a vertical direction, the conveyor belt formed of a plurality of connecting rods extending laterally across the belt, the belt having a conveying surface and an opposing surface. The spiral overlay includes a plurality of wire spirals, each formed of a single length of wire and forming a helix configured to extend laterally across the belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals are adapted to receive one of the rods to operatively connect said spirals. The plurality of wire spirals are configured in a first plane to define the conveying surface of the belt and configured in a second plane to define the opposing surface of the belt substantially parallel to the first plane, wherein the distance between the first plane and the second plane defines a vertical thickness of the spiral overlay. In addition, at least one wire forming the spiral overlay includes an intermediate loop between two of the opposed arcuate linking bends of the overlay. Further, the intermediate loop is coiled about a central axis that is substantially parallel to the first plane. Also, the intermediate loop has a first edge disposed furthest from the central axis in the vertical direction and a second edge configured to be disposed opposite the first edge in the vertical direction, and the first edge of the intermediate loop is disposed in the first plane.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
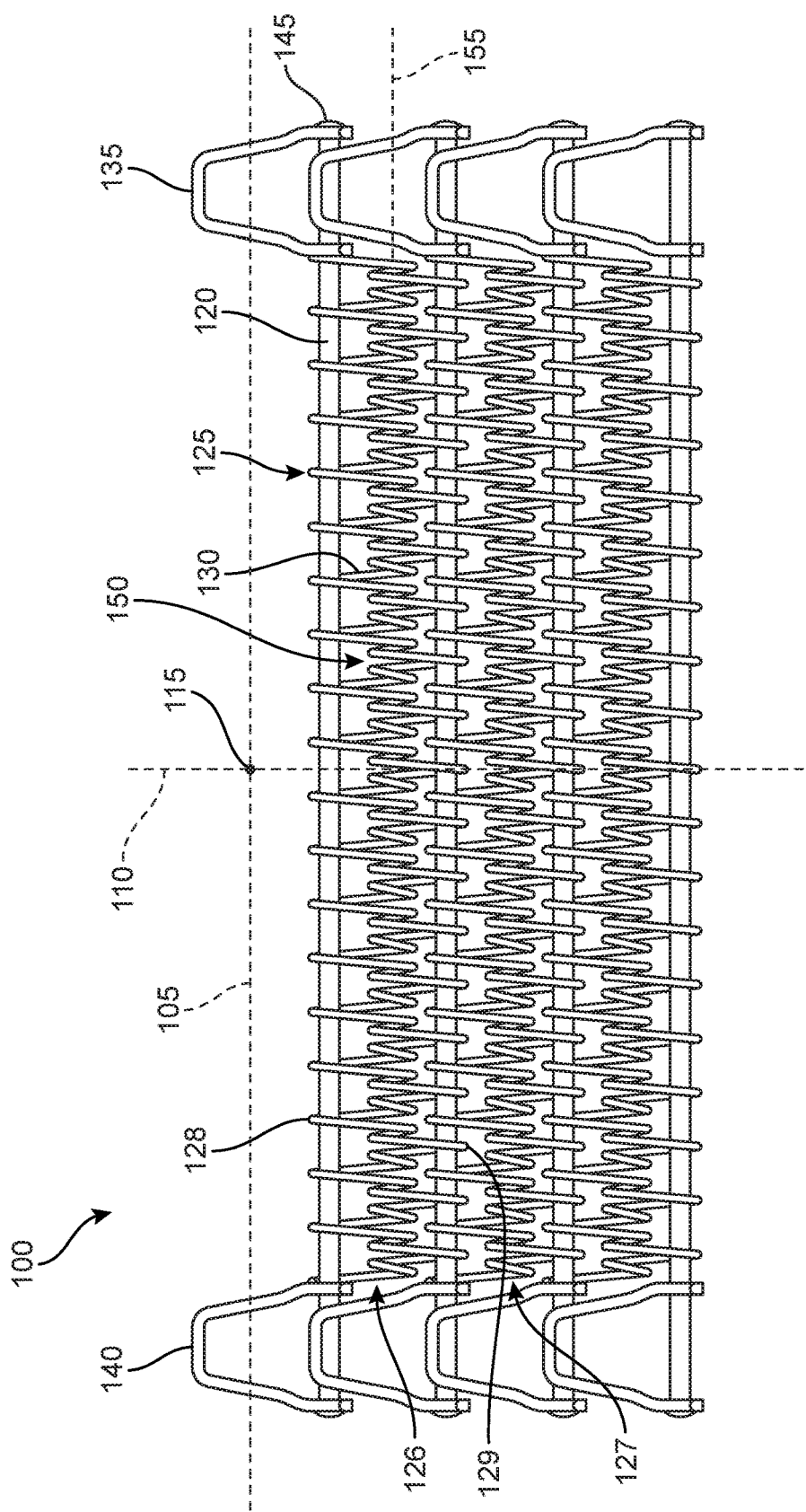
FIG. 1 is a schematic top view of a portion of a conveyor belt according to an exemplary disclosed embodiment.

FIG. 1 is a top view of a portion of a conveyor belt 100. In FIG. 1, directional orientations are indicated by axes. In particular, as shown in FIG. 1, conveyor belt 100 has a lateral axis 105 extending across conveyor belt 100 and defining a lateral direction. FIG. 1 also shows a longitudinal axis 110 extending along the belt including a conveying direction of the belt. In addition, FIG. 1 shows a vertical axis 115 perpendicular to lateral axis 105 and longitudinal axis 110 and defining a vertical direction.

As also shown in FIG. 1, conveyor belt 100 is formed of a plurality of connecting rods 120 extending laterally across conveyor belt 100. In addition, conveyor belt 100 has a conveying surface and an opposing surface. Since FIG. 1 is a top view of conveyor belt 100, FIG. 1 shows the conveying surface. The conveying surface is formed generally of a spiral overlay and endlinks.

As shown in FIG. 1, conveyor belt 100 includes a spiral overlay 125. Spiral overlay 125 includes a plurality of wire spirals, each formed of at least one wire 130. Each of the wire spirals is formed of a single length of wire and forms a helix configured to extend laterally across conveyor belt 100. For example, FIG. 1 shows a first wire spiral 126 and a second wires spiral 127. Each of the spirals includes opposed arcuate linking bends at locations across each said spiral. As shown in FIG. 1, first wire spiral 126 includes a first arcuate linking bend 128 and a second arcuate linking bend 129. The spirals of conveyor belt 100 are arranged relative to one another such that the linking bends are intermeshed with linking bends of an immediately adjacent spiral. As shown in FIG. 1, the arcuate linking bends of first wire spiral 126 may intermesh with the arcuate linking bends of second wire spiral 127. As further shown in FIG. 1, the intermeshed linking bends of adjacent spirals are adapted to receive one of the connecting rods to operatively connect the spirals.

In addition to spiral overlay 125, conveyor belt 100 also includes U-shaped endlinks on the lateral edges of the belt. For example, FIG. 1 shows a right endlink 135 and a left endlink 140. The endlinks may be welded to the connecting rods with welds. As shown in FIG. 1, welds 145 fixedly attach the endlinks to the connecting rods. In some embodiments, welds 145 are buttonless welds, as shown in FIG. 1. In other embodiments, the endlinks may be affixed to the connecting rods with other suitable methods. For example, in some cases, buttonheads may be used on the connecting rods to prevent the endlinks from sliding off the connecting rods. In some such embodiments, the buttonheads may be welded to the endlinks.

The term "buttonhead," in the context of conveyor belts, as will be recognized by skilled artisans, refers to a bulbous protrusion at an outer end of a rod. Such a bulbous protrusion not only protrudes from the outer surface of the link, but also has a diameter that is larger than the opening in the link leg through which the rod passes to prevent the rod from coming out of place. The term "buttonless," as will also be recognized by those having ordinary skill in the art, refers to rods not having buttonheads and, more specifically, to rods that terminate at free ends that have a diameter that is substantially the same or smaller than the rest of the rod. It shall also be understood, however, that "buttonless" does not preclude the possibility that a small stepped area could overlay the link aperture so that the small stepped area is substantially co-planar with the outer link surface without being precisely flush with the outer link surface. Detailed explanations of buttonheaded and buttonless conveyor belt rods are provided in Montgomery et al., U.S. Pat. No. 7,735,637, issued Jun. 15, 2010, the entire disclosure of which is incorporated herein by reference.

In the disclosed embodiments, the spiral overlays include intermediate loops disposed between arcuate linking bends of each wire spiral. For example, as shown in FIG. 1, wire 130 forming wire 126 of spiral overlay 125 includes an intermediate loop 150 between two of the opposed arcuate linking bends of the spiral overlay 125. Intermediate loop 150 includes a portion of wire 130 coiled about a central axis 155. As shown in FIG. 1, central axis 155 is substantially parallel to lateral axis 105, and is defined for purposes of describing the structure of a single wire spiral as illustrated. For purposes of description, directional adjectives such as forward or rearward or back and forth may be used, and it will be understood from the context that these directional adjectives may refer to the conveying direction of the belt, or the lateral extent of the belt.

Figure 2:
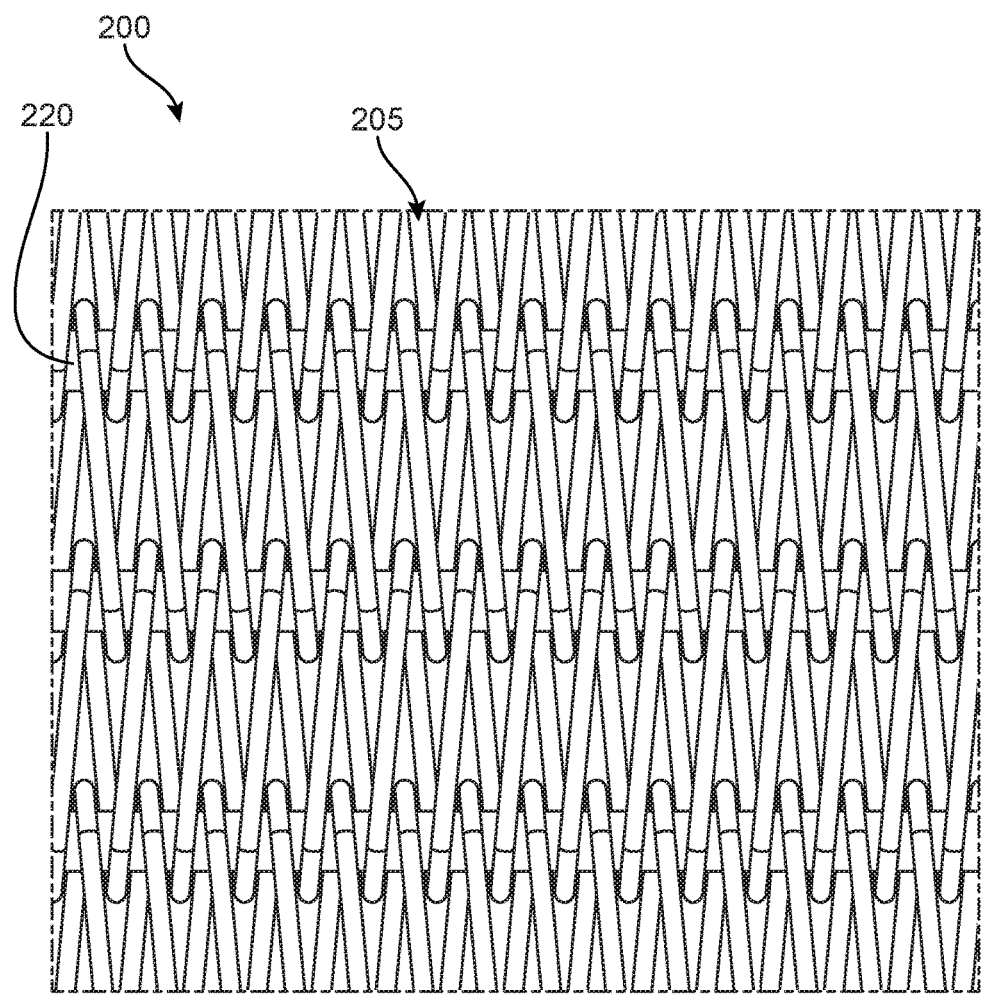
FIG. 2 is a schematic top view of a portion of a conveyor belt according to a prior art embodiment.

FIG. 2 is a top view of a portion of a conveyor belt according to a prior art embodiment for comparison. As shown in FIG. 2, prior art conveyor belt 200 includes a spiral overlay 205, including a plurality of wire spirals operatively connected to one another by a plurality of connecting rods 220. The wire spirals of FIG. 2 are conventional and are formed as straight segments of wires extending between adjacent connecting rods. There are no intermediate loops formed between the connecting rods. As shown in FIG. 2, such a configuration provides for a dense spiral overlay and close spacing between contact points between the wires and the connecting rods.

In certain applications, it may be desirable to provide a conveying surface while eliminating some of the contact points of each spiral with the connecting rods to reduce the overall density of the spiral overlay. Reducing the number of contact points also provides for a more open belt that may eliminate crevices and facilitates keeping the belt clean and cleaning, as well as permitting the flow of fluids over and through the conveyed articles. A more open belt may also facilitate heating or cooling/freezing of the conveyed articles. Forming a wire spiral with an intermediate loop preserves the integrity of the conveying surface while reducing the number of contact points between belt components and providing a more open overlay.

Figure 3:
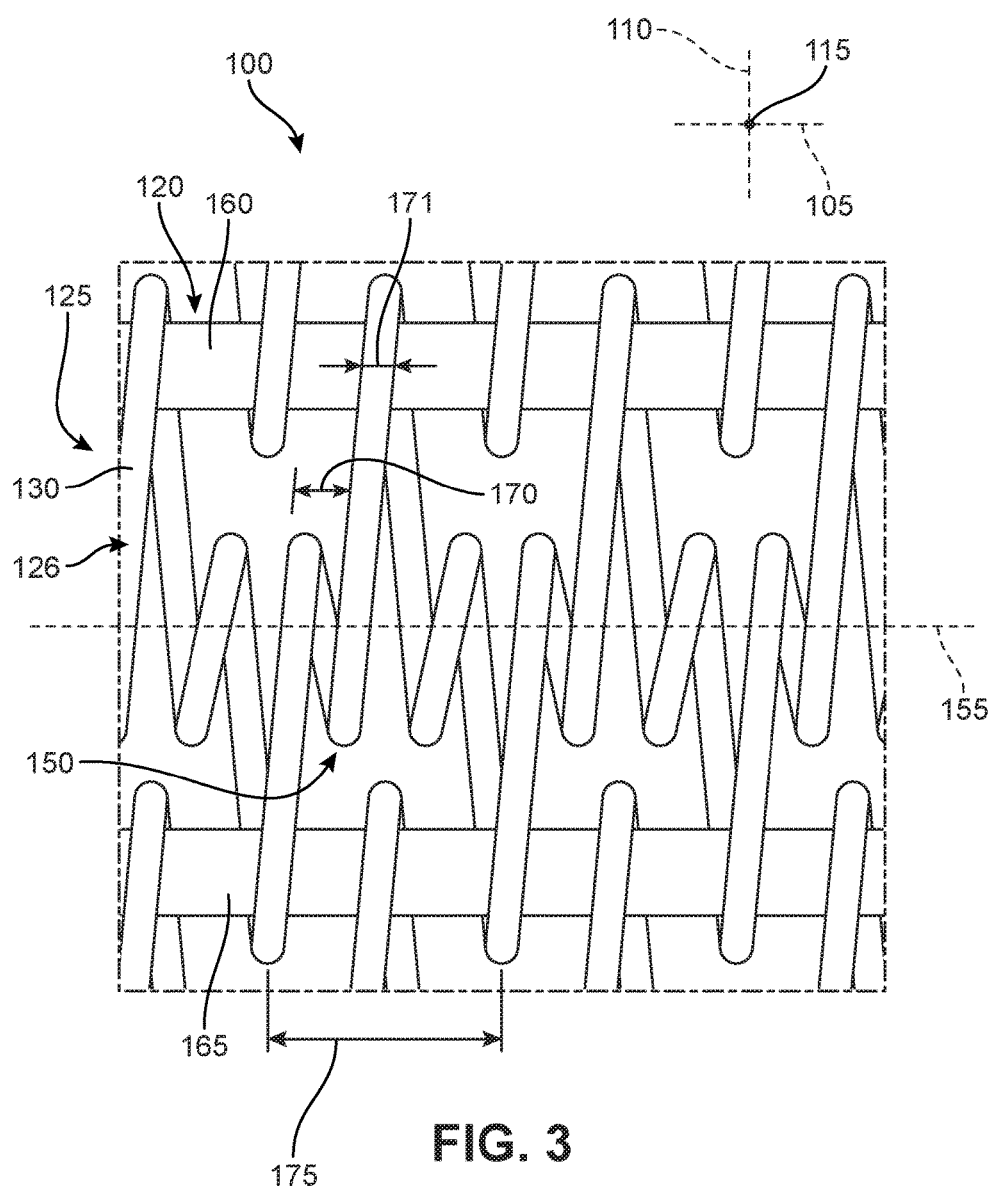
FIG. 3 is a schematic enlarged top view of a portion of the conveyor belt shown in FIG. 1.

FIG. 3 is an enlarged top view of a portion of conveyor belt 100. FIG. 3 shows two connecting rods 120, including first connecting rod 160 and second connecting rod 165. As shown in FIG. 3, wire 130 forms first wire spiral 126 of spiral overlay 125. Wire spiral 126 forms a helix extending laterally across conveyor belt 100. First wire spiral 126 includes opposed arcuate linking bends at locations at the forward and rearward ends of each said spiral at first connecting rod 160 and second connecting rod 165.

As shown in FIG. 3, wire 130 forms a portion of the conveying surface that includes intermediate loop 150. The portion of wire 130 that extends between first connecting rod 160 and second connecting rod 165 and includes intermediate loop 150 forms two separate portions of the conveying surface. That is, as the wire enters the loop from one side, the wire curves below the plane of the conveying surface. The wire extends around the loop and curves back up to the plane of the conveying surface at the other side of the loop. These two locations where the wire of the loop intersects with the plane of the conveying surface are displaced laterally from one another, thus forming a gap between the portions of the conveying surface formed by wire 130. The two portions of the conveying surface are offset laterally from one another by a distance that is greater than a thickness of the at least one wire. For example, as shown in FIG. 3, the amount of displacement is shown as first dimension 170. This amount of displacement shown by first dimension 170 is greater than the thickness of wire 130, which is indicated by a second dimension 171. This discontinuity in the conveying surface and the associated lateral displacement between portions of wire 130 create greater spacing between the arcuate linking bends of first wire spiral 126, which is indicated in FIG. 3 by dimension 175. In other embodiments, the lateral displacement provided by each intermediate loop may be the same or less than the thickness of the wire.

Figure 4:
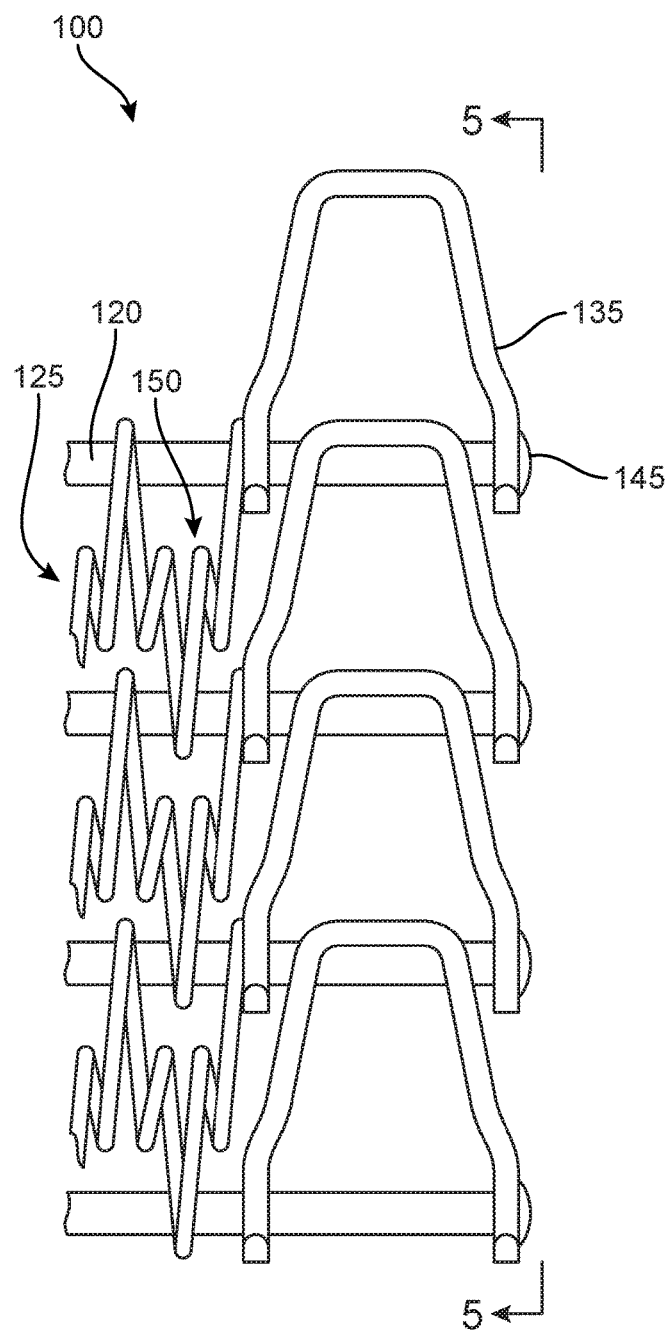
FIG. 4 is a schematic top view of a right edge region of the conveyor belt shown in FIG. 1.
Figure 5:
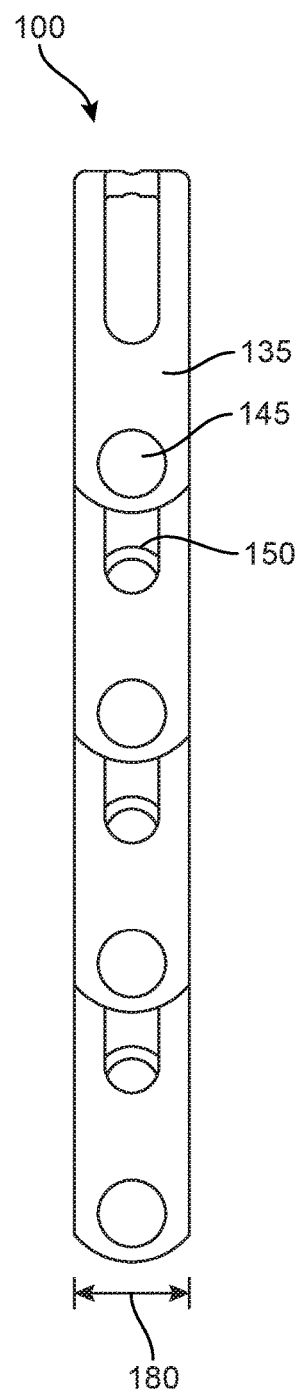
FIG. 5 is a schematic side view of the conveyor belt region shown in FIG. 4.

FIGS. 4-7 illustrate that the intermediate loops of conveyor belt 100 do not extend upward beyond the conveying surface of the belt and do not extend below the opposing surface of the belt. That is, the intermediate loops are within the planes of the belt, and are therefore planar with the belt surfaces. FIG. 4 is a top view of a right edge region of conveyor belt 100, and FIG. 5 shows a side view of the portion of conveyor belt 100 shown in FIG. 4. As shown in FIG. 5, intermediate loop 150 is visible through the slotted opening in endlink 135. The height of endlink 135 is illustrated by dimension 180. As shown in FIG. 5, intermediate loop 150 is not visible except through the slotted opening, and thus, intermediate loop 150 does not have a height that is greater than dimension 180.

The plurality of wire spirals of the conveyor belt may be configured in a first plane to define the conveying surface of the belt and configured in a second plane to define the opposing surface of the belt substantially parallel to the first plane. The distance between the first plane and the second plane defines a vertical thickness of the spiral overlay. The intermediate loops may have heights that are the same or less than the vertical thickness of the spiral overlay.

Figure 6:
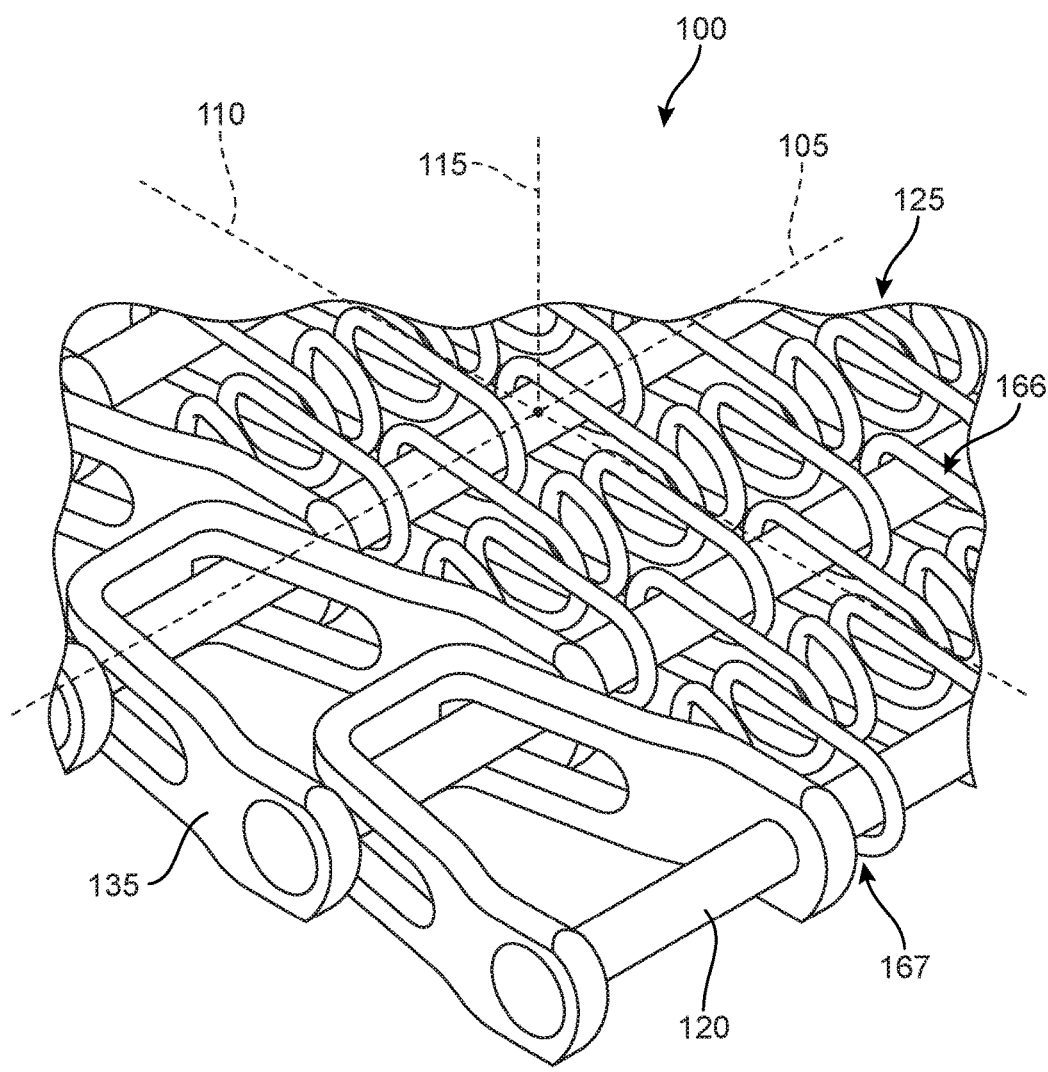
FIG. 6 is a schematic perspective view of a left edge region of the conveyor belt shown in FIG. 1.

FIG. 6 is a perspective view of a left edge region of conveyor belt 100. FIG. 6 better illustrates vertical axis 115. FIG. 6 also illustrates that spiral overlay 125 provides a conveying surface 166 in a first plane. In addition, spiral overlay 125 provides an opposing surface 167 in a second plane. FIG. 6 shows intermediate loop 150 coiled about central axis 155, which is substantially parallel to the first plane.

Figure 7:
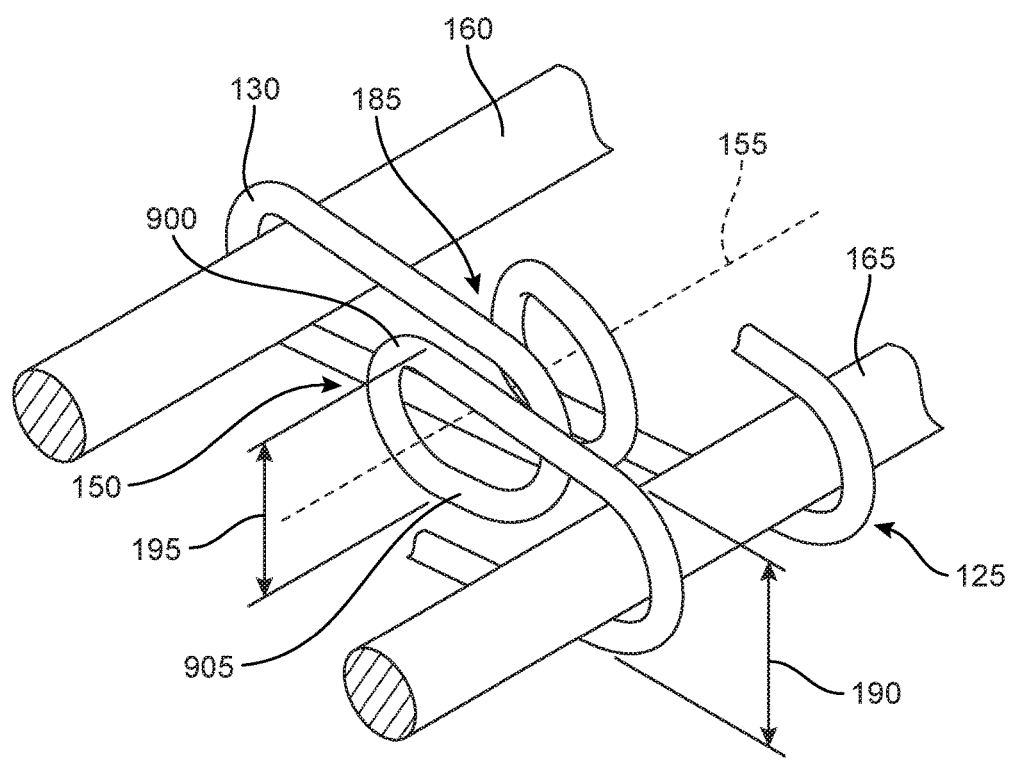
FIG. 7 is a schematic enlarged view of a portion of a spiral overlay according to an exemplary disclosed embodiment.

FIG. 7 is an enlarged view of a portion of spiral overlay 125. FIG. 7 shows two intermediate loops, including intermediate loop 150 and a second intermediate loop 185. Intermediate loop 150 has a first edge 900 disposed furthest from central axis 155 in the vertical direction and a second edge 905 disposed opposite first edge 900 in the vertical direction. As shown in FIG. 7, spiral overlay 125 may have a thickness 190 between the first plane of the conveying surface and the second plane of the opposing surface. As also shown in FIG. 7, the intermediate loops, including first intermediate loop 150 have a height 195 that is substantially the same as thickness 190 of spiral overlay 125. Accordingly, first edge 900 of intermediate loop 150 is disposed in the first plane. Also, second edge 905 of intermediate loop 150 is disposed in the second plane.

In some embodiments, the conveyor belt may include provisions to limit longitudinal collapse of the belt. For example, in some embodiments, the conveyor belt may be configured such that the intermediate loops prevent the connecting rods from becoming closer together than a predetermined minimum distance. That is, the intermediate loops may serve as bump stops or spacers that limit the collapse of the belt.

Figure 8:
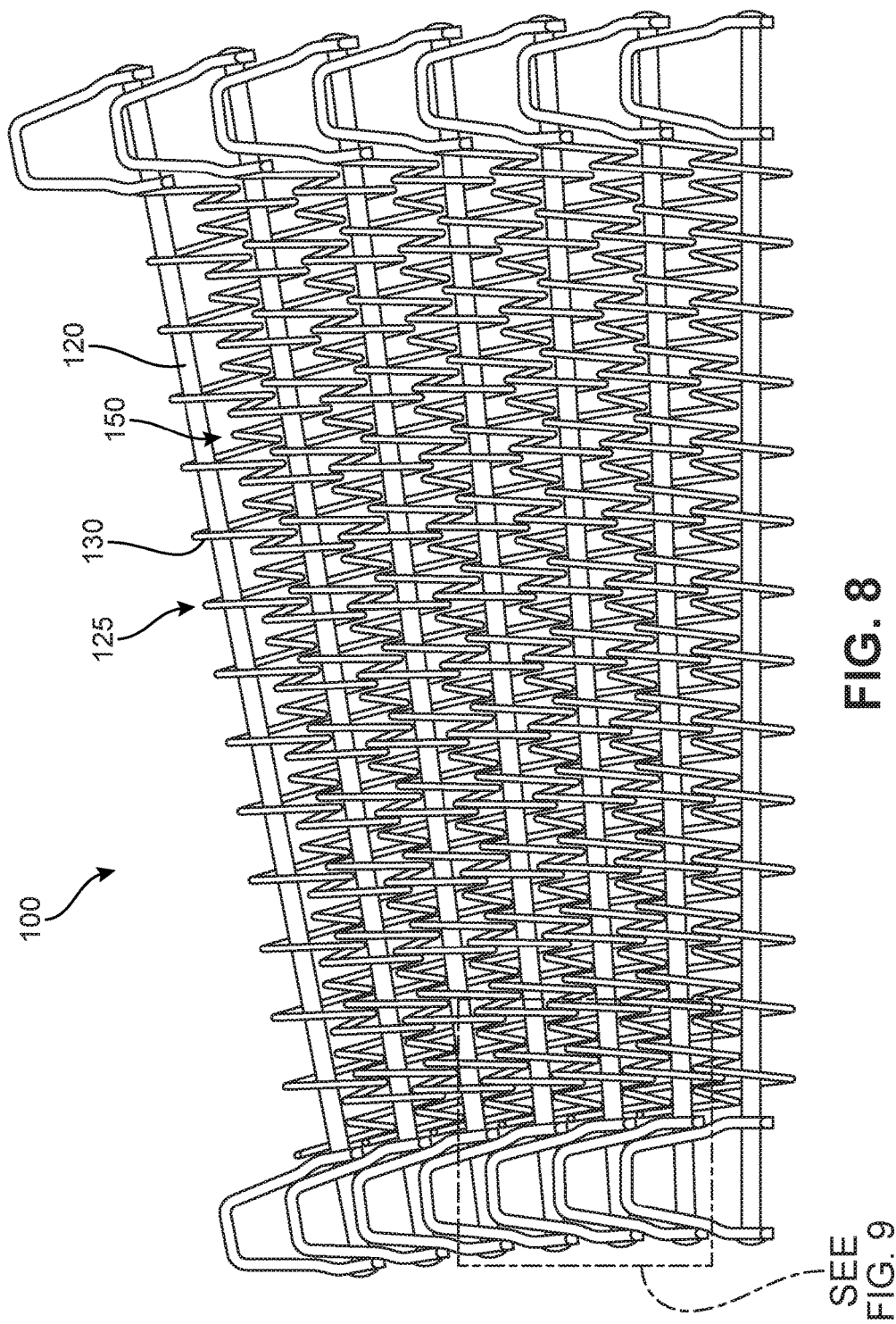
FIG. 8 is a schematic top view of a portion of the conveyor belt shown in FIG. 1 while navigating a curve.
Figure 9:
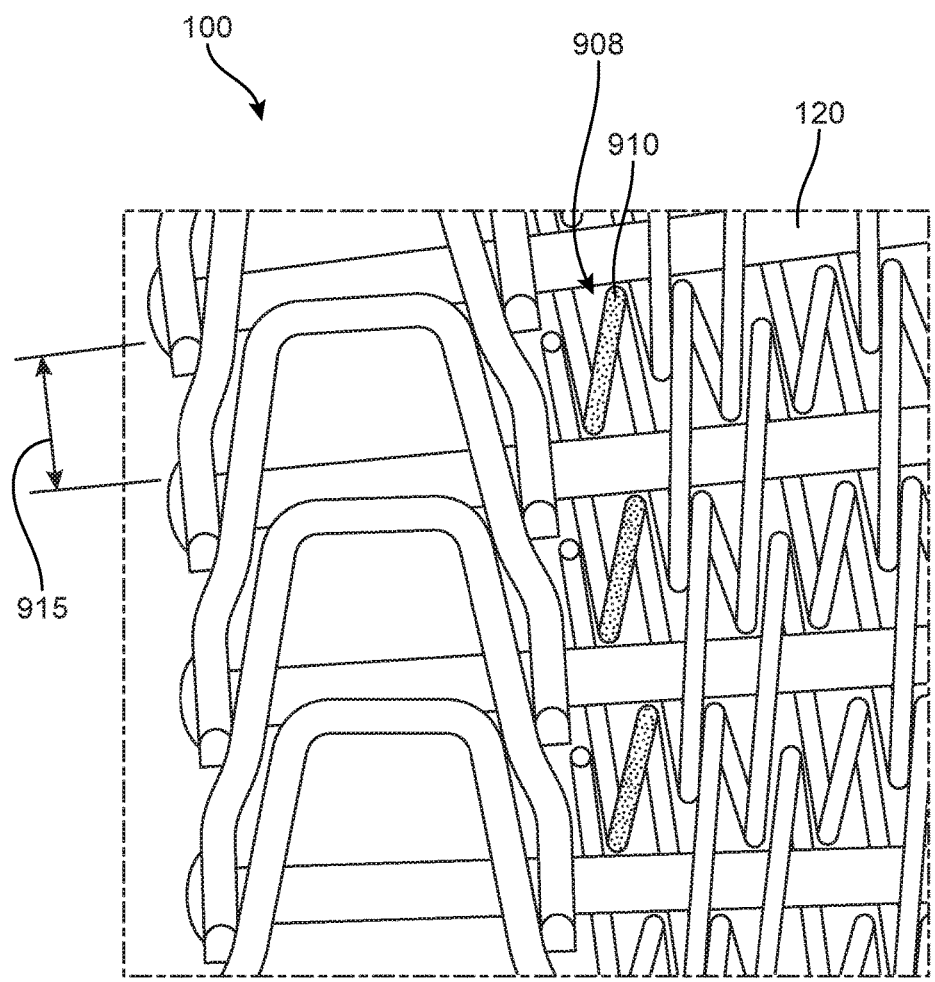
FIG. 9 is a schematic view of a left edge region of the conveyor belt shown in FIG. 8.

FIGS. 8 and 9 illustrate a belt collapse limiting feature of conveyor belt 100. FIG. 8 is a top view of a portion of conveyor belt 100 while navigating a curve. FIG. 9 is an enlarged view of a left edge region of conveyor belt 100 as indicated in FIG. 8. As shown in FIG. 9, an intermediate loop 908 is configured to limit longitudinal collapse of belt 100 by maintaining a minimum spacing 915 between adjacent connecting rods 120.

In embodiments, such as those shown herein, wherein the upper and lower edges of the intermediate loops reside in the plane of the conveying surface and in the plane of the opposing surface, respectively, the amount of supporting surface will be substantially maximized for the general configuration. However, it may be desirable for some applications to have less surface area of the spiral overlay in the conveying surface or the opposing surface. For example, it may be desired to provide greater access to the articles on the conveyor belt from underneath. In such embodiments, it may be desirable to include the intermediate loop in order to provide the collapse prevention described above.

Accordingly, in some embodiments, the upper edges of the intermediate loops may be disposed below the plane of the conveying surface of the spiral overlay. Similarly, the lower edges of the intermediate loops may be disposed above the plane of the opposing surface of the spiral overlay. If a belt space is considered that includes the first plane, the second plane, and the space between the first plane and the second plane, in some embodiments, the entire intermediate loop is disposed within the belt space.

In some embodiments, the configuration of the spiral overlay may vary. For example, the shape of the intermediate loops, the angles at which the wire spirals are oriented, the number of loops, the number of coils in each spiral, and other parameters may vary. Alternatively or additionally, the configurations of different intermediate loops within the same belt may vary.

In some embodiments, the intermediate loops may be configured to facilitate manufacturing of the spiral overlay. For example, the spiral overlay may be manufactured using a wire bending process. The more bends placed in the wire, the longer the process may take. Therefore, in some embodiments, the spiral overlay may include a reduced number of intermediate loops.

Figure 10:
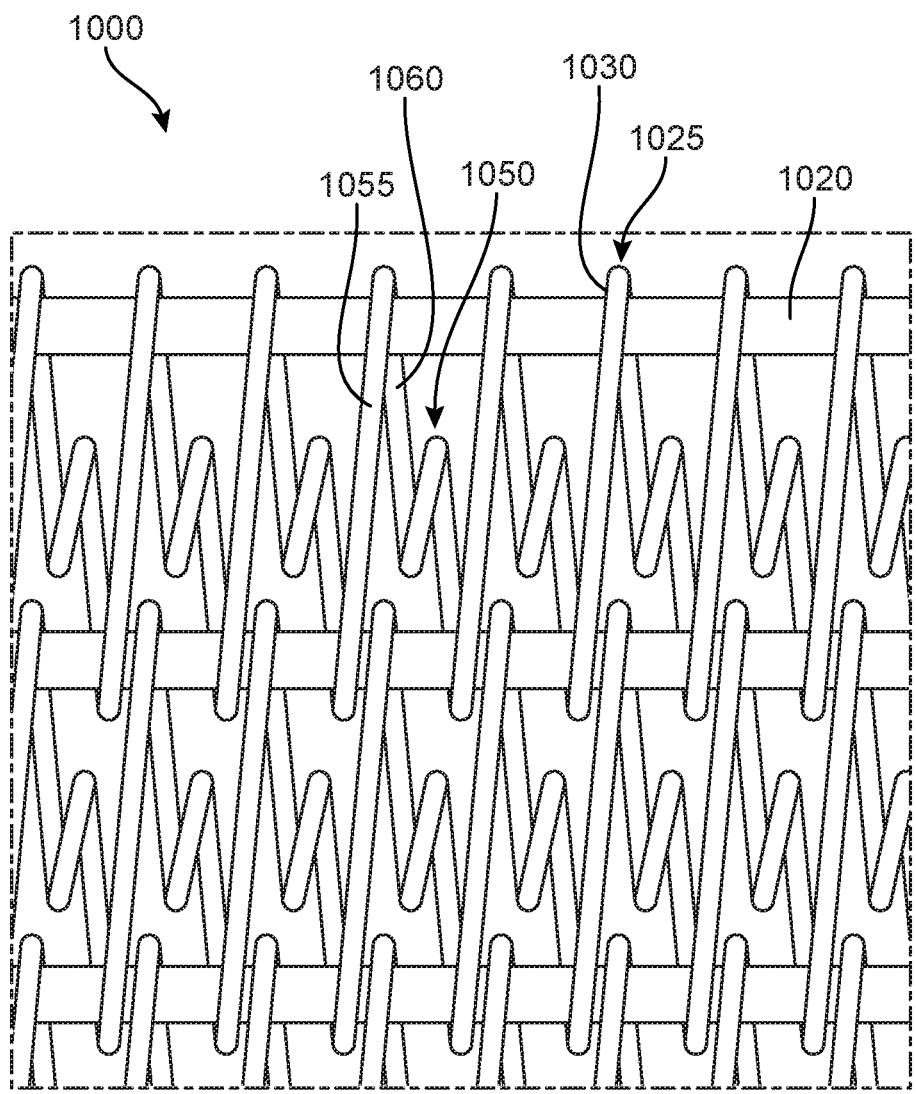
FIG. 10 is a schematic view of a portion of a conveyor belt according to another exemplary disclosed embodiment.

FIG. 10 is a top view of a portion of a conveyor belt 1000 according to another exemplary disclosed embodiment. As shown in FIG. 10, conveyor belt 1000 includes a plurality of connecting rods 1020 and a spiral overlay 1025. Spiral overlay 1025 includes at least one wire 1030, which includes portions that extend in a first plane of the conveying surface and portions that extend in the second plane of the opposing surface. As shown in FIG. 10, spiral overlay 1025 includes a plurality of intermediate loops.

In the embodiment shown in FIG. 10, the intermediate loops are provided on every other spiral of the overlay. For example, as shown in FIG. 10, a first segment 1055 of wire 1030 extends directly between connecting rods 120, whereas a second segment 1060 includes an intermediate loop 1050 between the opposing arcuate linking bends of wire 1030.

In the embodiment of FIG. 10, the edges of the intermediate loops that form discontinuities in the surface plane are provided on the lower surface of the belt. That is, as shown in FIG. 10, the portions of wire 1030 that extend in the first plane (e.g., first segment 1055) are continuous, and the portions that extend in the second plane (e.g., second segment 1060) are discontinuous at intermediate loops disposed between the opposed arcuate linking bends of spiral overlay 1025. In some embodiments, the configuration of FIG. 10 may be reversed, and the discontinuous portions of the intermediate loops may be disposed on the upper surface of the belt.

In some embodiments, the spiral overlay may include other provisions to facilitate production of the spirals and intermediate loops. For example, in some embodiments, the angles at which the segments of the wire forming the spiral overlay may vary. In some cases, certain segments may be oriented in the longitudinal direction, whereas other segments of the wire may be oriented at a non-zero angle with respect to the longitudinal direction. Forming the spiral overlay with some of the wire segments oriented in the longitudinal direction may reduce the complexity of the wire bending process.

Figure 11:
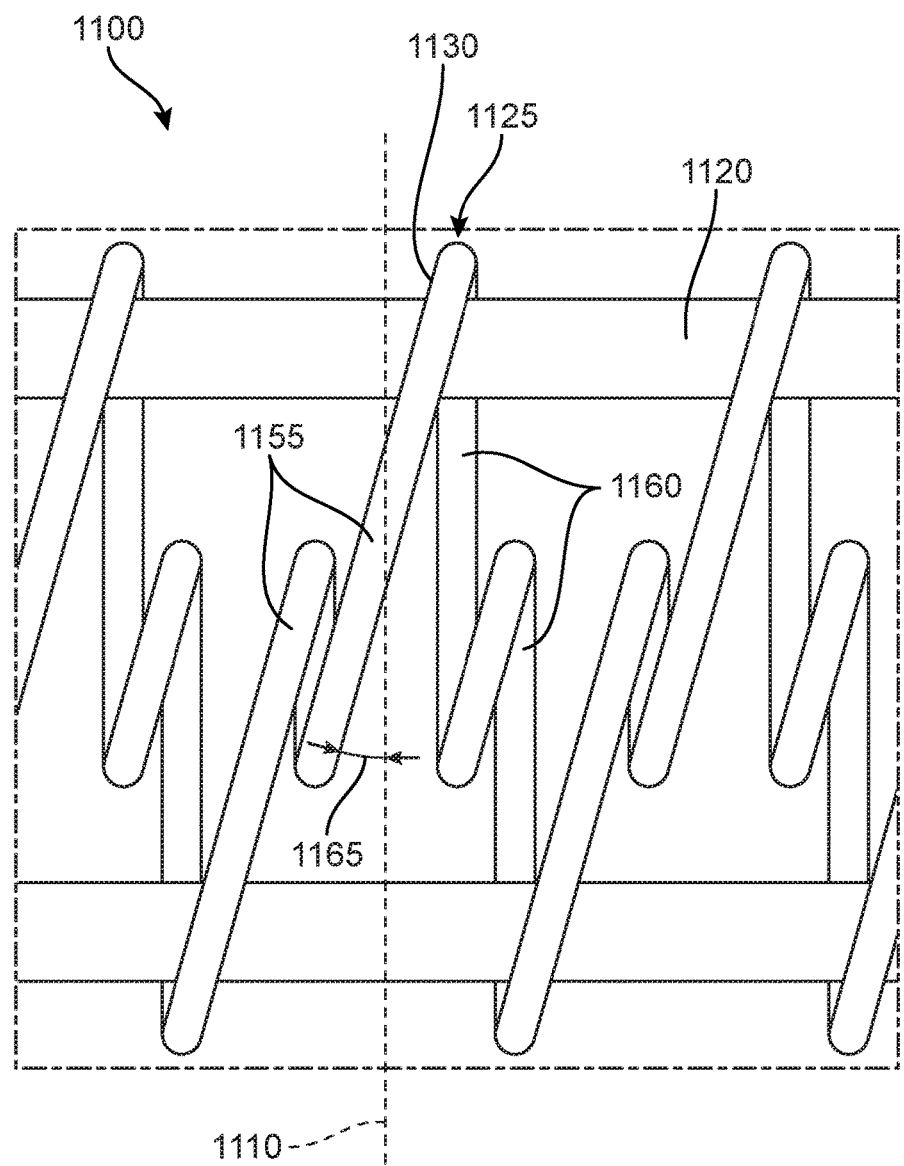
FIG. 11 is a schematic view of a portion of a conveyor belt according to another exemplary disclosed embodiment.

FIG. 11 is a top view of a portion of a conveyor belt 1100 according to another exemplary disclosed embodiment. Conveyor belt 1100 includes a plurality of connecting rods 1120 and a spiral overlay 1125. FIG. 11 shows one wire 1130 of spiral overlay 1125. Wire 1130 includes first portions 1155 that extend in the first plane of the conveying surface and second portions 1160 that extend in the second plane of the opposing surface of the belt. As also shown in FIG. 11, first portions 1155 each extend at a non-zero angle 1165 with respect to a longitudinal axis 1110. Further, second portions 1160 extend in a longitudinal direction (i.e., parallel to longitudinal axis 1110). In other embodiments, the angular orientation of segments of the spiral overlay may vary.

The shape and/or size of the intermediate loops can vary to provide different characteristics. For example, the shape and/or size of the intermediate loops can be varied to provide more or less surface area for the conveying surface. Such variations may also affect how much open space there is in the mesh, and may also affect the weight of the belt.

Figure 12:
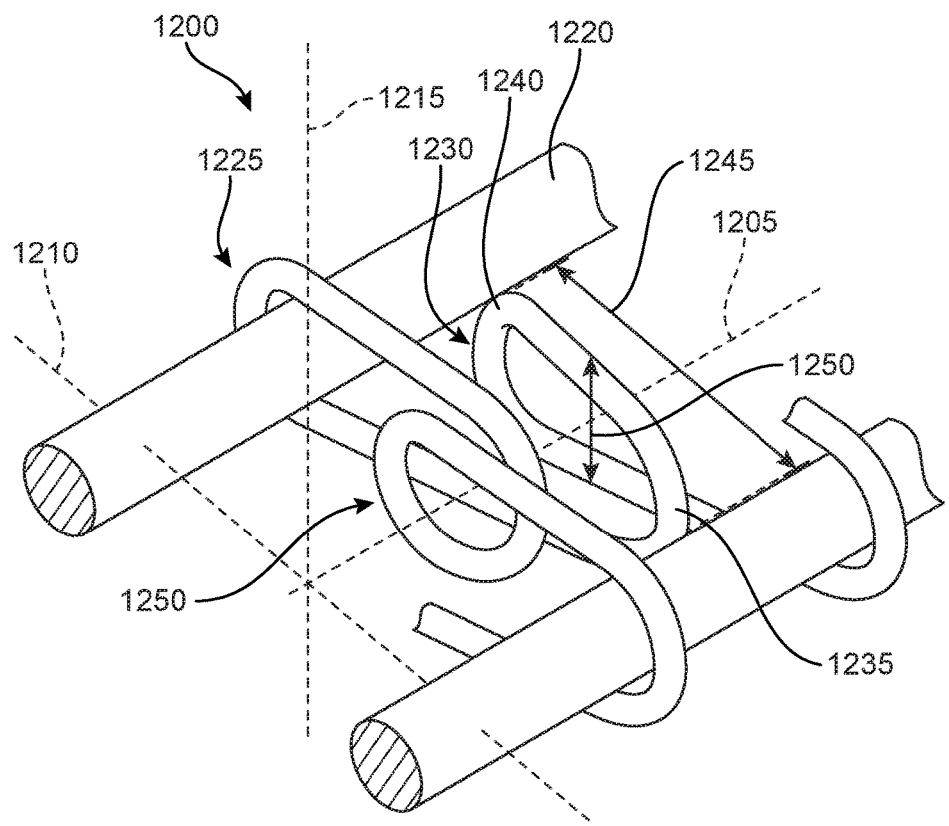
FIG. 12 is a schematic view of a portion of a conveyor belt according to another exemplary disclosed embodiment.

FIG. 12 is a schematic view of a portion of a conveyor belt according to another exemplary disclosed embodiment. As shown in FIG. 12, a conveyor belt 1200 is formed of a plurality of connecting rods 1220 connecting wire spirals of a spiral overlay 1225.

In FIG. 12, directional orientations are indicated by axes. In particular, as shown in FIG. 1, conveyor belt 1200 has a lateral axis 1205 extending across conveyor belt 1200 and defining a lateral direction. FIG. 12 also shows a longitudinal axis 1210 extending along the belt including a conveying direction of the belt. In addition, FIG. 12 shows a vertical axis 1215 perpendicular to lateral axis 1205 and longitudinal axis 1210 and defining a vertical direction.

As shown in FIG. 12, conveyor belt 1200 includes at least one intermediate loop 1230 having a substantially oval shape. That is, as indicated in FIG. 12, intermediate loop 1230 may have a length 1245 in the direction of longitudinal axis 1210 and a height in the direction of vertical axis 1215, wherein length 1245 is longer than height 1250. Use of an oval intermediate loop may provide an increase in surface area in the conveying surface as compared to a circular intermediate loop.

In some embodiments, conveyor belt 1200 has intermediate loops having other shapes in addition to oval intermediate loop 1230. For example, as shown in FIG. 12, conveyor belt 1200 has a substantially circular intermediate loops 1250. In other embodiments, all of the intermediate loops may be oval.

Figure 13:
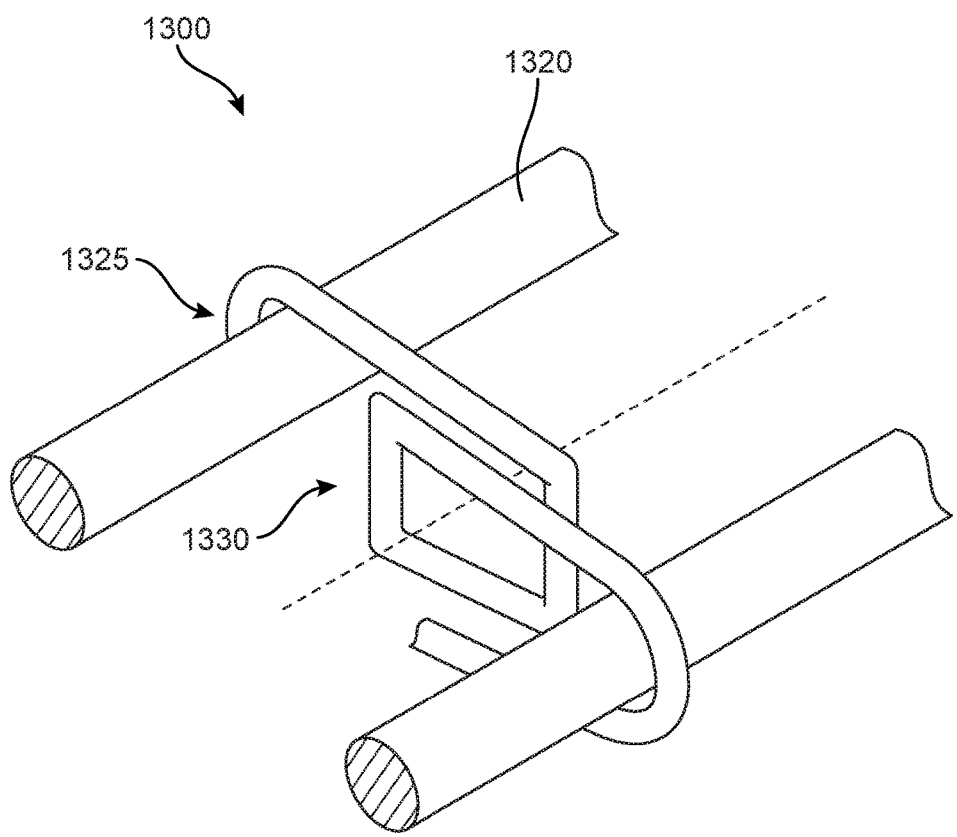
FIG. 13 is a schematic view of a portion of a conveyor belt according to another exemplary disclosed embodiment.

In other embodiments, the intermediate loops may have other non-circular shapes. For example, FIG. 13 is a schematic view of a portion of a conveyor belt having at least one substantially rectangular intermediate loop. In particular, FIG. 13 shows a conveyor belt 1300 formed of a plurality of connecting rods 1320 connecting wire spirals of a spiral overlay 1325. As shown in FIG. 13, spiral overlay 1325 of conveyor belt 1300 includes at least one intermediate loop 1330 having a substantially rectangular shape. Like an oval intermediate loop, a rectangular intermediate loop may provide an increase in surface area in the conveying surface as compared to a circular intermediate loop.

In some embodiments, one or more intermediate loops may form upstands that extend above the conveying surface of the belt. Such upstands may form dividers or fences to retain products in a desired area of the belt. For example, such upstands may be arranged longitudinally to form lane dividers. In other embodiments, such upstands may be arranged laterally to divide longitudinal sections of the belt. In other embodiments, such upstands may be provided at the lateral edges of the belt in order to prevent products from falling off the belt.

Figure 14:
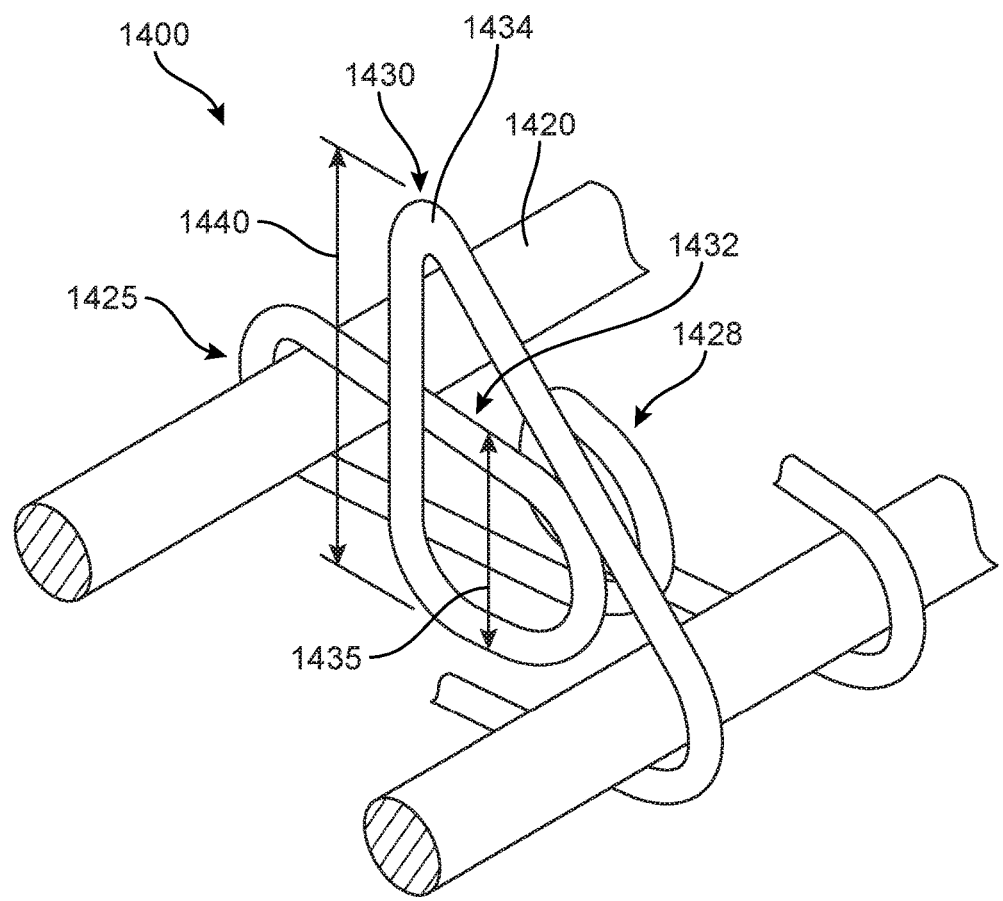
FIG. 14 is a schematic view of a portion of a conveyor belt according to another exemplary disclosed embodiment.

FIG. 14 is a schematic view of a portion of a conveyor belt 1400. Conveyor belt 1400 is formed of a plurality of connecting rods 1420 connecting wire spirals of a spiral overlay 1425. As shown in FIG. 14, spiral overlay 1425 of conveyor belt 1400 includes at least one intermediate loop 1428 formed within the thickness of conveyor belt 1400, as discussed above with respect to other embodiments. The upper portions of spiral overlay 1425 form a conveying surface 1432. In addition, spiral overlay 1425 also includes at least one intermediate loop 1430 formed between opposed arcuate linking bends of spiral overlay 1425 and having an upstanding portion 1434 configured to extend above conveying surface 1432. As shown in FIG. 14, conveyor belt 1400 has a thickness 1435, and upstanding portion 1434 of intermediate loop 1430 has a height 1440 that is greater than thickness 1435 of conveyor belt 1400.

In some embodiments, more than one intermediate loop can be provided between opposed arcuate linking bends of the spiral overlay. The number of intermediate loops between opposed arcuate linking bends determines the amount of contact area between the spiral and the connecting rods. The more intermediate loops between opposed arcuate linking bends, the more lateral distance there is between the opposed arcuate linking bends. In some embodiments, the wire spiral of the spiral overlay may include a plurality of intermediate loops formed between at least a first set of opposed arcuate linking bends of the spiral overlay, the plurality of intermediate loops being disposed within the belt thickness.

Figure 15:
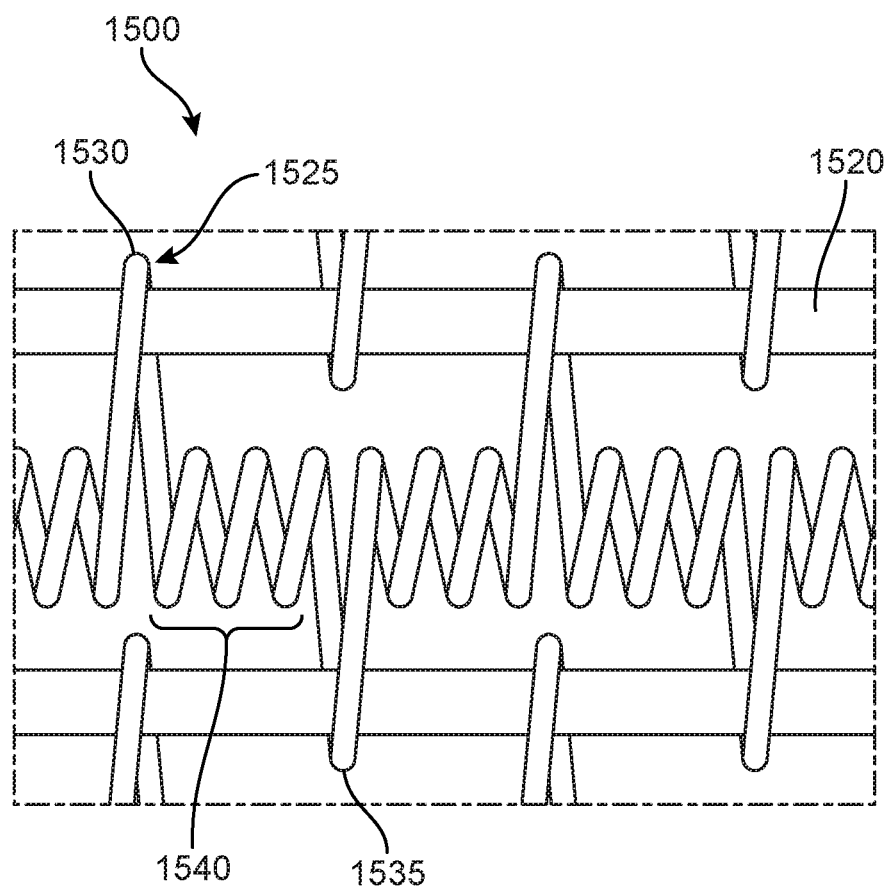
FIG. 15 is a schematic view of a portion of a conveyor belt according to another exemplary disclosed embodiment.

This may FIG. 15 is a schematic view of a portion of a conveyor belt 1500. Conveyor belt 1500 is formed of a plurality of connecting rods 1520 connecting wire spirals of a spiral overlay 1525. As shown in FIG. 15, spiral overlay 1525 includes a first arcuate linking bend 1530 and a second arcuate linking bend 1535 opposed to first arcuate linking bend 1530. As further shown in FIG. 15, the wire spiral includes a plurality of intermediate loops 1540 formed between first arcuate linking bend 1530 and second arcuate linking bend 1535.

In some embodiments, the arrangement of intermediate loops may be provided in a particular pattern. For example, the same number of intermediate loops may be provided between each pair of opposed arcuate linking bends across the width of the belt. In other embodiments, the number of intermediate loops may vary across the belt. For example, in some embodiments, more intermediate loops may be provided at a lateral edge of the belt, so that the center portion of the belt includes more opposed arcuate linking bends in order to support more weight.

In some embodiments, the arrangement of intermediate loops may be provided without a particular pattern across the belt. That is, the number of intermediate loops between each pair of opposed arcuate linking bends may vary across the width of the belt without a particular pattern. For example, intermediate loops may be provided in groups of two, three, and four, but need not necessarily be positioned in numerical order.

Figure 16:
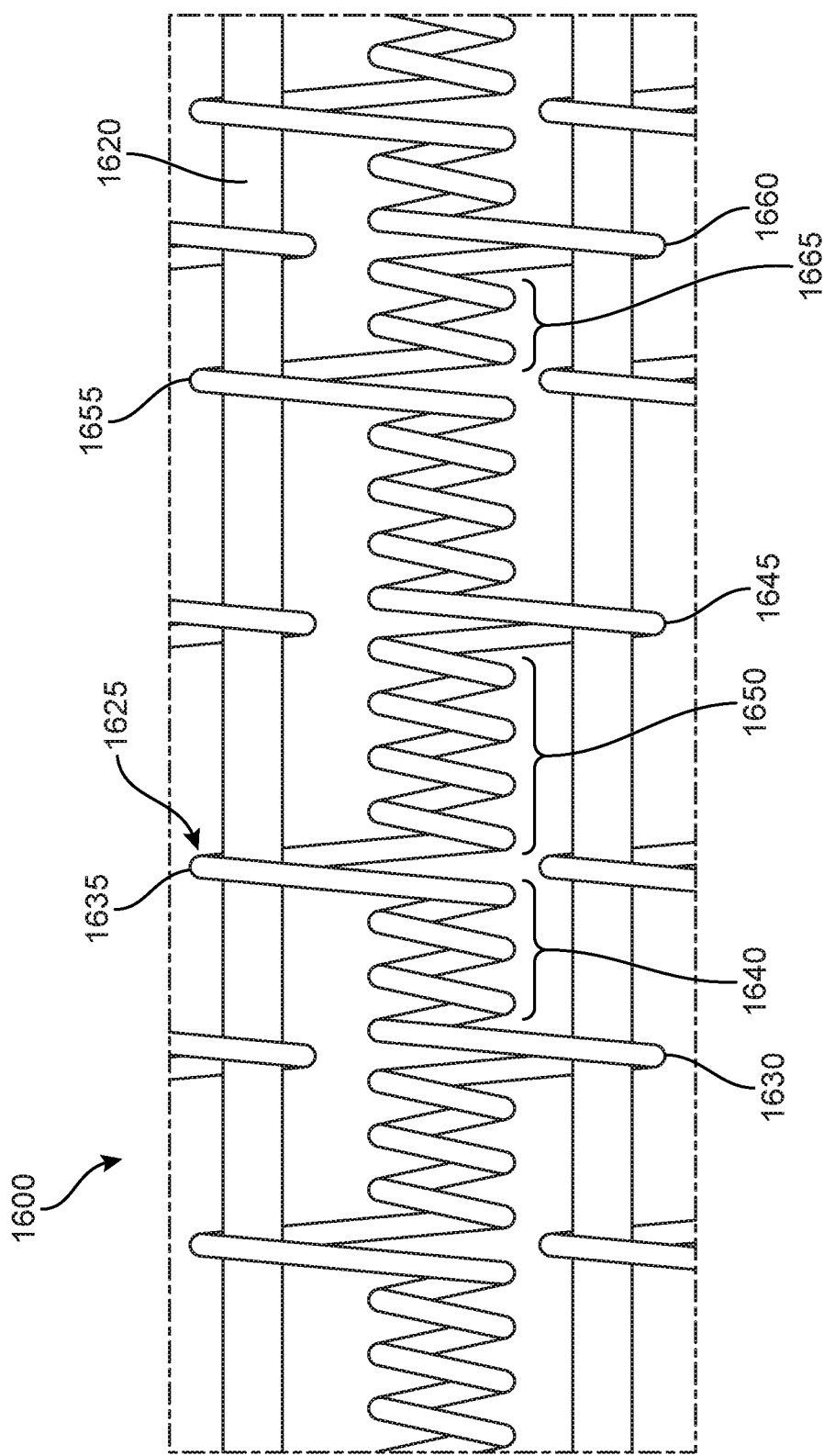
FIG. 16 is a schematic view of a portion of a conveyor belt according to another exemplary disclosed embodiment.

FIG. 16 is a schematic view of a portion of a conveyor belt 1600. Conveyor belt 1600 is formed of a plurality of connecting rods 1620 connecting wire spirals of a spiral overlay 1625. Spiral overlay 1625 includes a first arcuate liking bend 1630, a second arcuate liking bend 1635, a third arcuate liking bend 1645, a fourth arcuate liking bend 1655, a fifth arcuate liking bend 1660. Spiral overlay 1625 includes a first plurality of intermediate loops 1640 formed between first arcuate liking bend 1630 and second arcuate liking bend 1635. As shown in FIG. 16, first plurality of intermediate loops 1640 includes three intermediate loops. In addition, spiral overlay 1625 includes a second plurality of intermediate loops 1650 formed between second arcuate liking bend 1635 and third arcuate liking bend 1645. As shown in FIG. 16, second plurality of intermediate loops 1650 includes four intermediate loops, and thus consists of a different number of intermediate loops than first plurality of intermediate loops 1640. Also, spiral overlay 1625 includes a third plurality of intermediate loops 1665 formed between fourth arcuate liking bend 1655 and fifth arcuate linking bend 1660. As shown in FIG. 16, third plurality of intermediate loops 1665 includes two intermediate loops.

In some embodiments, the number of opposed arcuate linking bends grouped together between intermediate loops may vary. For example, in some embodiments, a first set of arcuate linking bends adjacent one another may have a plurality of linking bends and a second set of arcuate linking bends may also include a plurality of linking bends. One or more intermediate loops may be disposed between the first set of arcuate linking bends and the second set of arcuate linking bends. Use of more linking bends than intermediate loops may provide the belt with more load carrying capacity.

Figure 17:
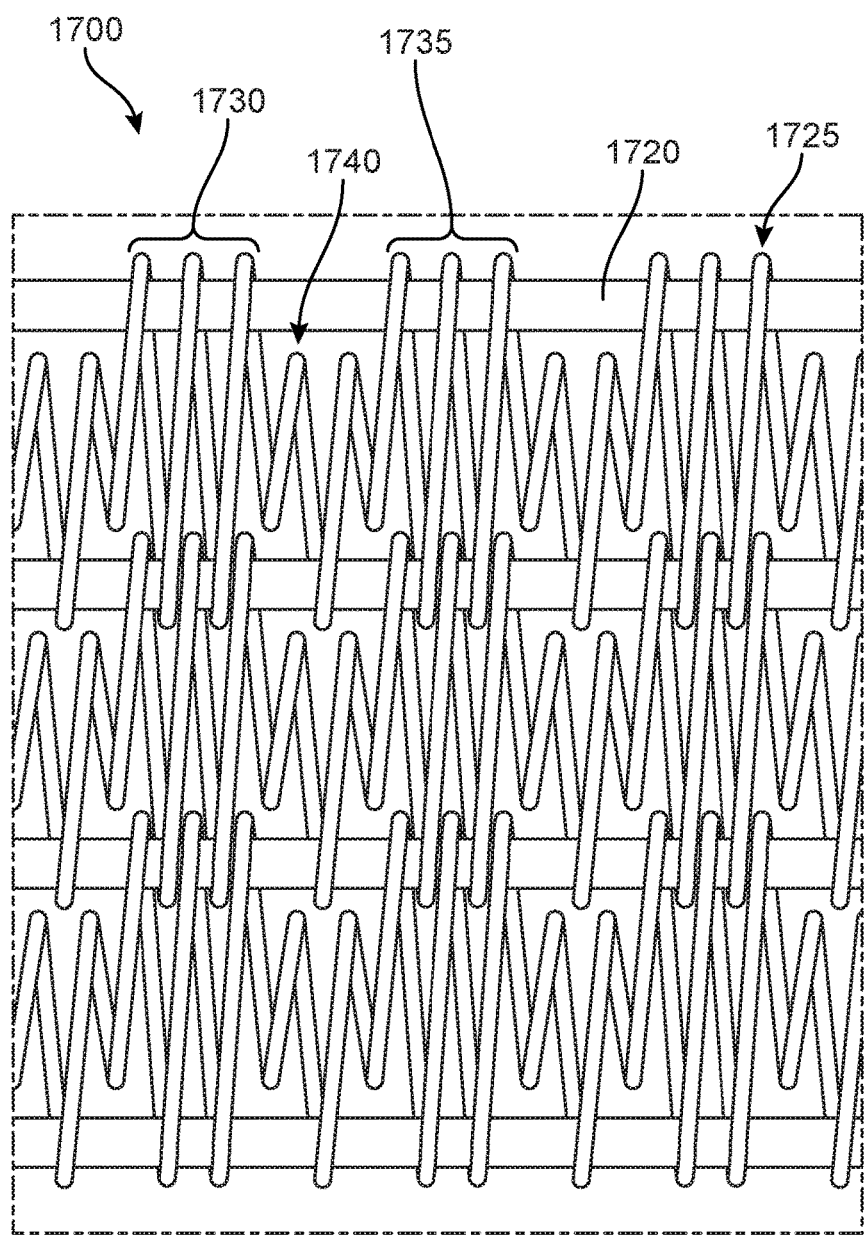
FIG. 17 is a schematic view of a portion of a conveyor belt according to another exemplary disclosed embodiment.

FIG. 17 is a schematic view of a portion of a conveyor belt 1700. Conveyor belt 1700 is formed of a plurality of connecting rods 1720 connecting wire spirals of a spiral overlay 1725. At least one spiral of spiral overlay 1725 includes a first set of forward arcuate linking bends 1730 adjacent one another and a second set of forward arcuate linking bends 1735 adjacent one another. As shown in FIG. 17, the wire includes at least one intermediate loop 1740 disposed laterally between first set of forward arcuate linking bends 1730 and second set of forward arcuate linking bends.

In some embodiments, intermediate loops may be provided in select portions of the belt. For example, in some embodiments, intermediate loops may be provided only in a lateral edge portion of the belt. Such a configuration may preventing buckling of the belt by restricting the amount by which the connecting rods may collapse toward one another in the longitudinal direction. In other embodiments, the lateral edge portion of the spiral overlay may be provided without intermediate loops in order to facilitate collapse of the connecting rods toward one another during turning. In such embodiments, larger size intermediate loops may be utilized in the central portion of the belt, which, if used in the lateral portion of the belt, would inhibit the collapse of the rods.

Figure 18:
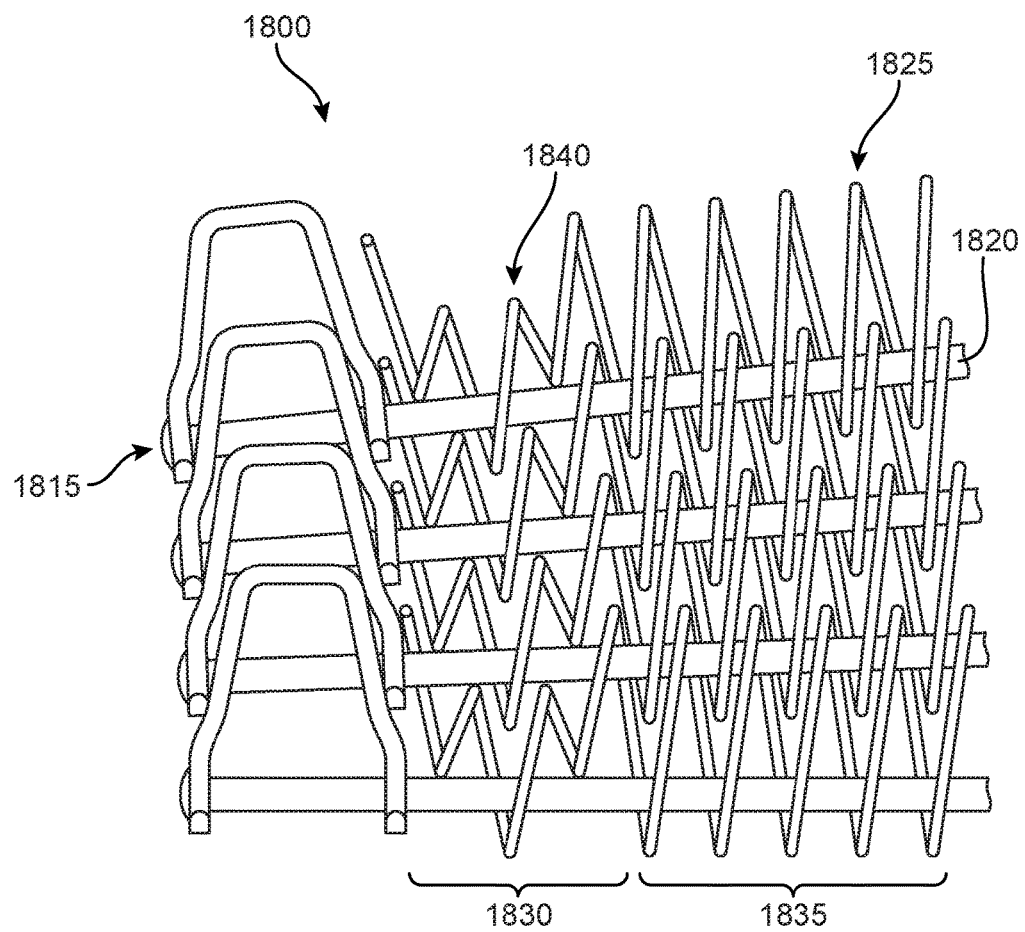
FIG. 18 is a schematic view of a portion of a conveyor belt according to another exemplary disclosed embodiment.

FIG. 18 is a schematic view of a portion of a conveyor belt 1800. Conveyor belt 1800 is formed of a plurality of connecting rods 1820 connecting wire spirals of a spiral overlay 1825. As shown in FIG. 18, spiral overlay 1825 includes a lateral edge portion 1830 configured to be disposed proximate a lateral edge 1815 of conveyor belt 1800. In addition, spiral overlay 1825 includes a central portion 1835 configured to form a substantial majority of the width of conveyor belt 1800. As further shown in FIG. 18, spiral overlay 1825 includes at least one intermediate loop 1840 provided in the lateral edge portion 1830 of spiral overlay 1825. In addition, central portion 1835 of spiral overlay 1825 is formed without intermediate loops between arcuate linking bends of the spiral.

Figure 19:
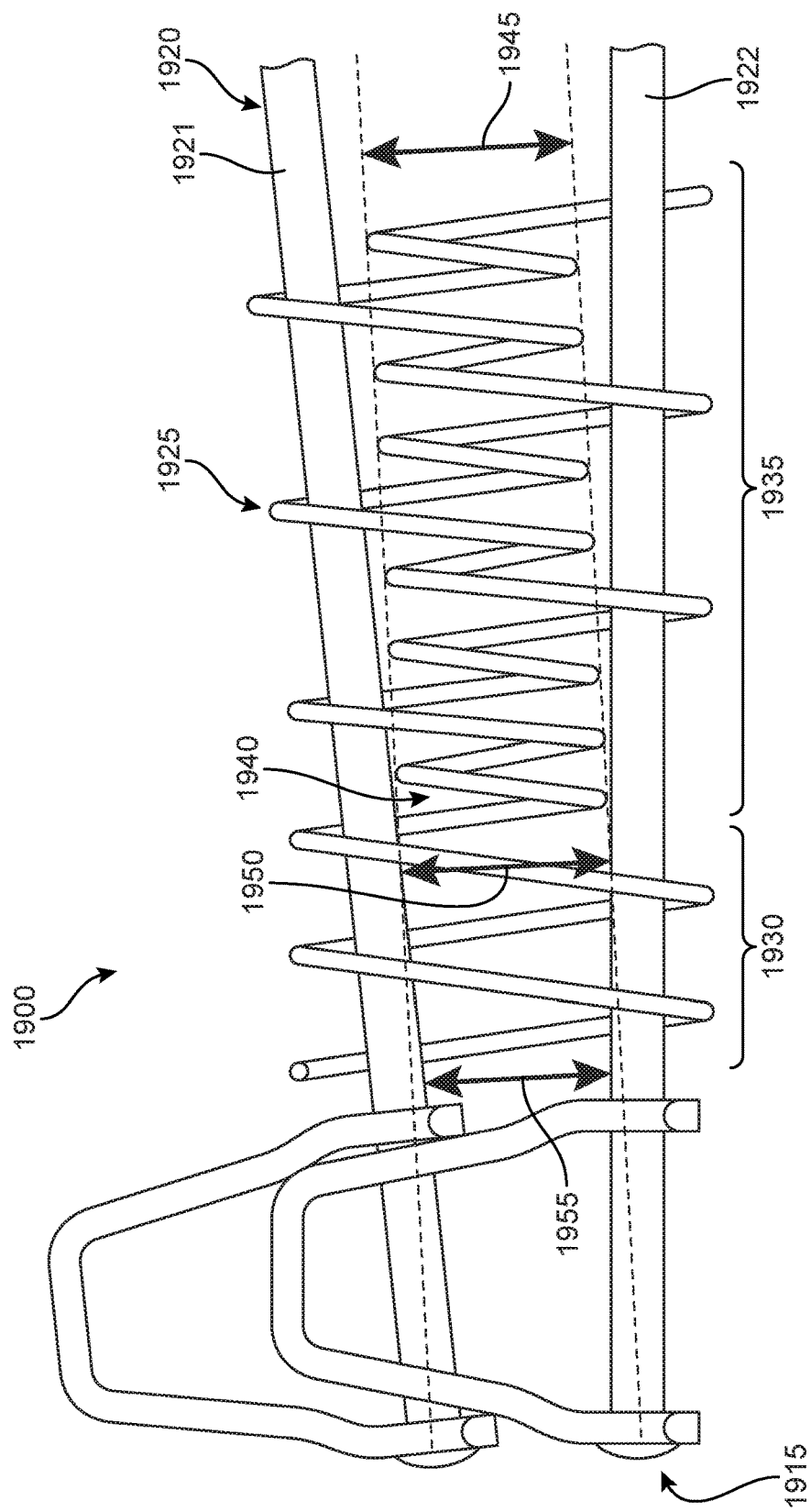
FIG. 19 is a schematic view of a portion of a conveyor belt according to another exemplary disclosed embodiment.

FIG. 19 is a schematic view of a portion of a conveyor belt 1900. Conveyor belt 1900 is formed of a plurality of connecting rods 1920 connecting wire spirals of a spiral overlay 1925. As shown in FIG. 19, spiral overlay 1925 includes a lateral edge portion 1930 configured to be disposed proximate a lateral edge 1915 of conveyor belt 1900. In addition, spiral overlay 1925 includes a central portion 1935 configured to form a substantial majority of the width of conveyor belt 1900. Spiral overlay 1925 also includes at least one intermediate loop 1940 provided in central portion 1935 of spiral overlay 1925. As shown in FIG. 19, lateral edge portion 1930 of spiral overlay 1925 is formed without intermediate loops between arcuate linking bends of the spiral. The intermediate loops have a length 1945. Thus, the intermediate loops limit the collapse of first connecting rod 1921 toward second connecting rod 1922 to a minimum distance 1950, which is the same as length 1945. However, because lateral edge portion 1930 of spiral overlay 1925 does not include intermediate loops, the connecting rods can collapse to a distance 1955, which is shorter than the length 1945 of the intermediate spirals. This configuration utilizes the benefits of intermediate spirals in the central portion of the belt without limiting the ability of the belt to navigate turns.

In some embodiments, instead of omitting intermediate loops altogether in the lateral portions of the belt, the length of the intermediate loops may be reduced in the lateral regions of the belt. For example, the belt may include a plurality of intermediate loops having varying lengths in the conveying direction, and intermediate loops that are disposed in a lateral portion of the spiral overlay configured to be disposed proximate a lateral edge of a conveyor belt may have shorter lengths in the conveying direction than intermediate loops located in a central portion of the spiral overlay. This may provide the benefits of intermediate loops (e.g., increased conveying surface area) all the way to the lateral edge of the spiral overlay.

Figure 20:
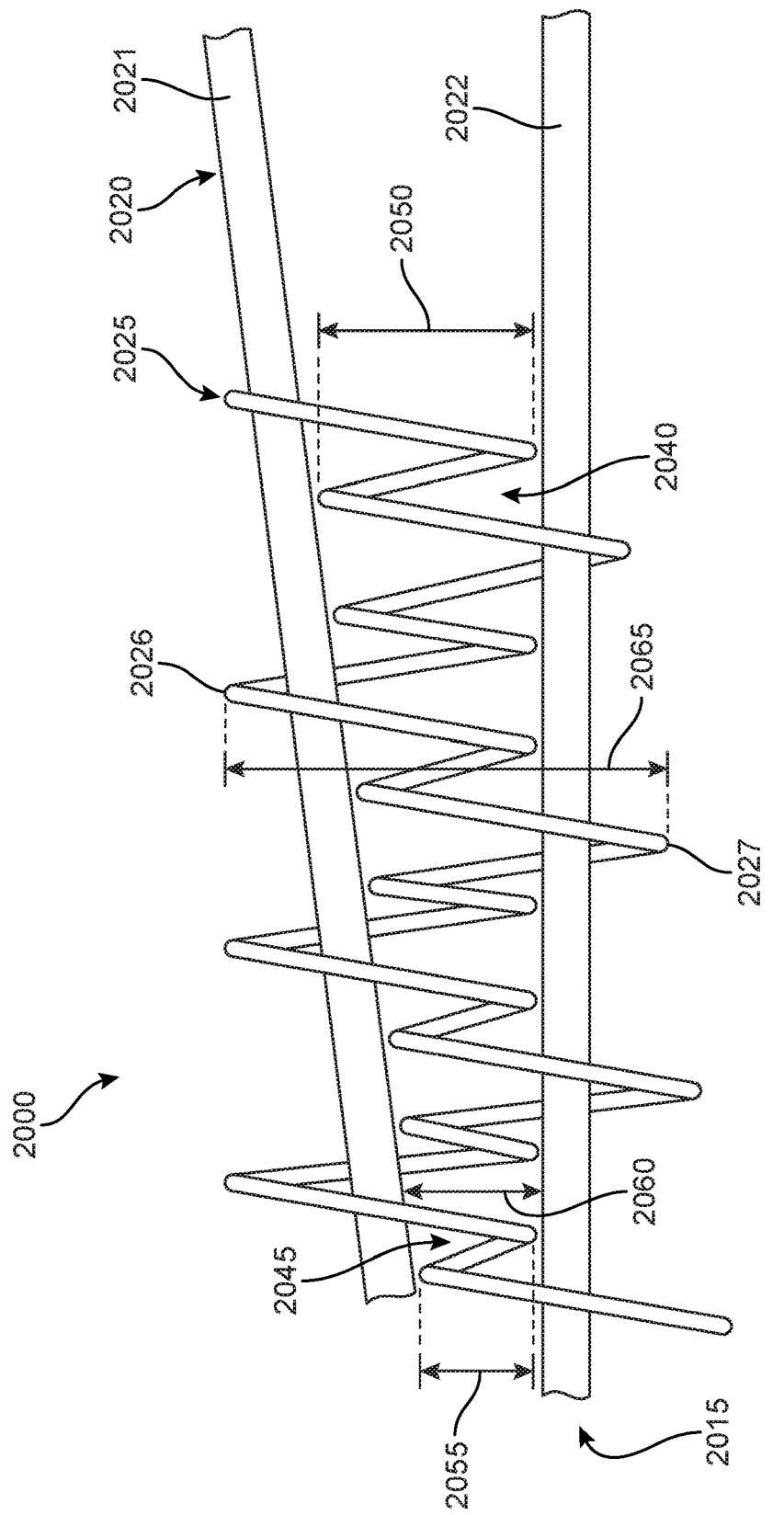
FIG. 20 is a schematic view of a portion of a conveyor belt according to another exemplary disclosed embodiment.

FIG. 20 is a schematic view of a portion of a conveyor belt 2000. Conveyor belt 2000 is formed of a plurality of connecting rods 2020 connecting wire spirals of a spiral overlay 2025. As shown in FIG. 20, spiral overlay 2025 includes a first intermediate loop 2040 having a first longitudinal length 2050 in the conveying direction. In addition, spiral overlay 2025 includes a second intermediate loop 2055 disposed in a lateral portion of spiral overlay 2025 having a second longitudinal length in the conveying direction. As shown in FIG. 20, second longitudinal length 2055 may be shorter than first longitudinal length 2050.

This shorter second longitudinal length 2055 may enable a first connecting rod 2021 to collapse toward a second connecting rod 2022 to a longitudinal distance 2060. As shown in FIG. 20, longitudinal distance 2060 between the connecting rods in the lateral portion of the belt may be shorter than first longitudinal length 2050.

In addition, as shown in FIG. 20, spiral overlay 2025 may have opposed arcuate linking bends that have a consistent distance. For example, a first arcuate linking bend 2026 and a second arcuate linking bend 2027 may have a distance 2065 between them. This distance may be substantially the same for all opposed arcuate linking bends of spiral overlay 2025. This may enable conveyor belt 2000 to be utilized on a straight run and around curves.

In some embodiments, the spiral overlay may be configured for use on a curved conveying path only. Accordingly, the lengths of both the intermediate loops and the distances between opposed arcuate linking bends in the spiral may be smaller in the lateral portions of the belt. This may distribute the forces more evenly through the spiral overlay.

Figure 21:
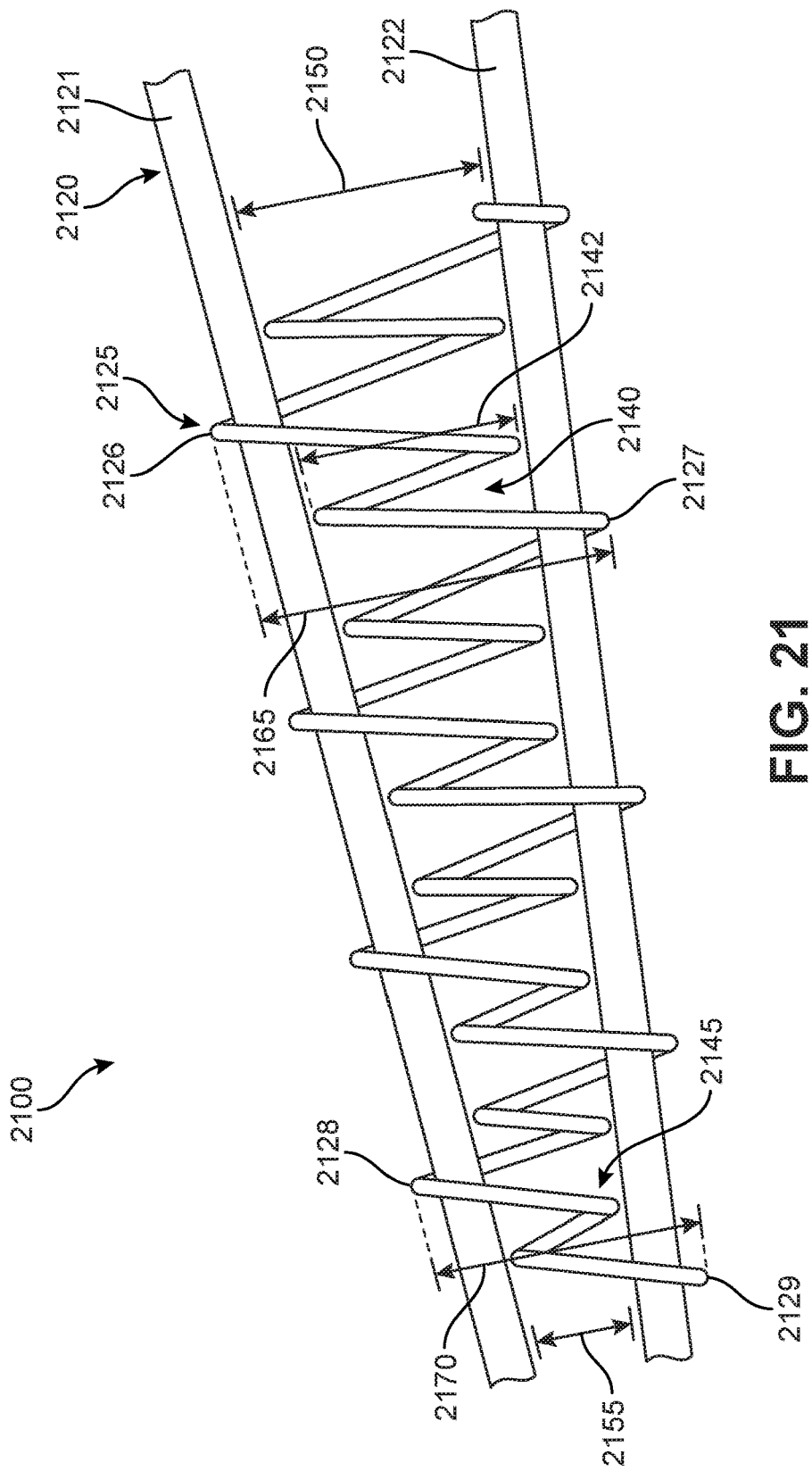
FIG. 21 is a schematic view of a portion of a conveyor belt according to another exemplary disclosed embodiment.

FIG. 21 is a schematic view of a portion of a conveyor belt 2100. Conveyor belt 2100 is formed of a plurality of connecting rods 2120 connecting wire spirals of a spiral overlay 2125. As shown in FIG. 21, spiral overlay 2125 includes a first intermediate loop 2140 having a first longitudinal length 2142 in the conveying direction. In addition, spiral overlay 2125 includes a second intermediate loop 2145 disposed in a lateral portion of spiral overlay 2125 having a second longitudinal length 2155 in the conveying direction. As shown in FIG. 21, second longitudinal length 2155 is shorter than first longitudinal length 2142.

In addition, the distances between opposed arcuate linking bends in the conveying direction are shorter in a lateral portion of the spiral overlay than in a central portion of the spiral overlay. Spiral overlay 2125 includes a first arcuate linking bend 2126 and a second arcuate linking bend 2127 defining a first length 2165. Spiral overlay 2125 also includes a third arcuate linking bend 2128 and a fourth arcuate linking bend 2129 defining a second length 2170. As shown in FIG. 21, second length 2170 is shorter than first length 2165.

In some embodiments, the intermediate loops may be configured to extend around a connecting rod of the conveyor belt. Thus, the intermediate loop may extend around a connecting rod at one end and may be free floating between connecting rods at the opposing end of the intermediate loop. This configuration may reduce the amount of contact between spiral wires and the connecting rods, but may provide additional support strength over intermediate loops that reside completely between connecting rods.

Figure 22:
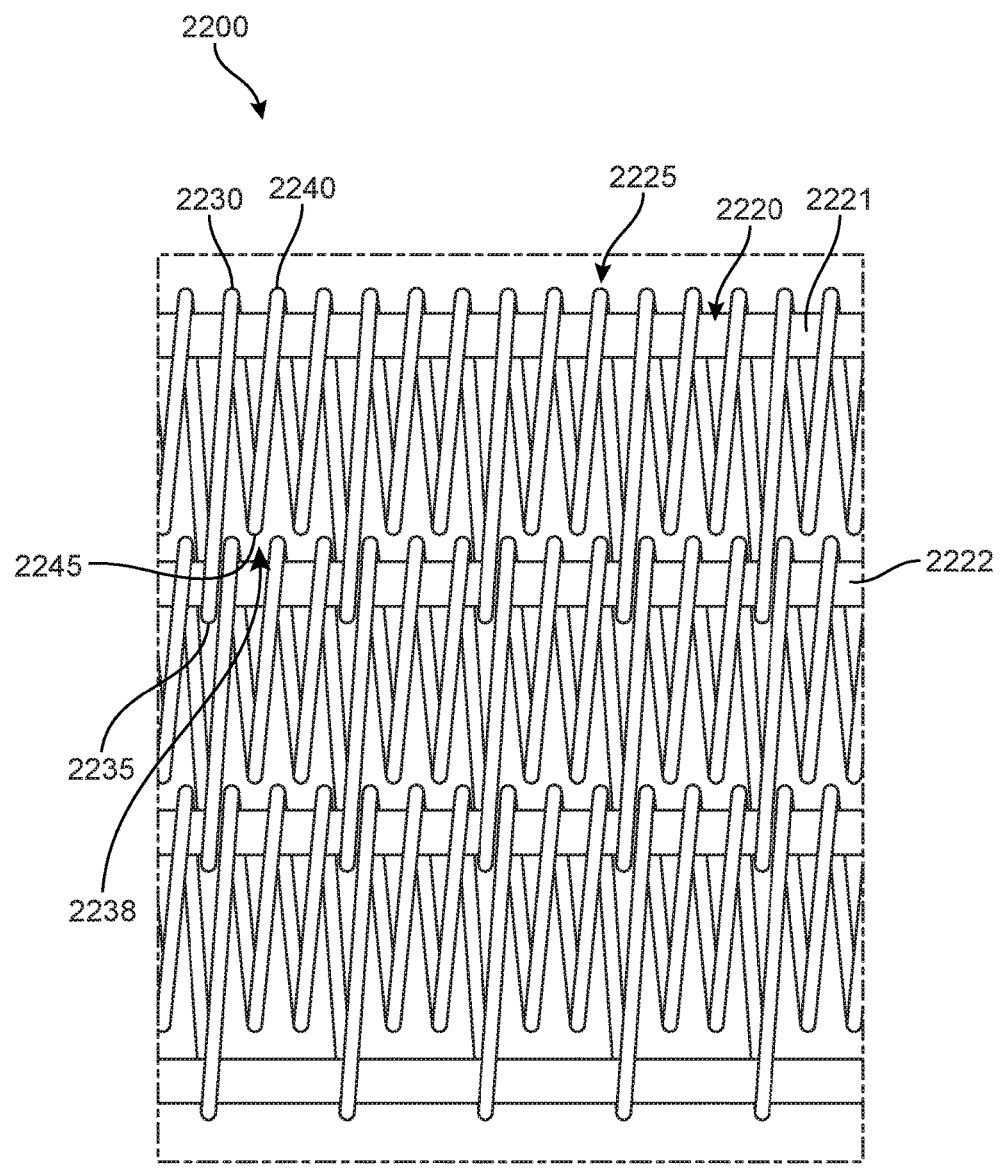
FIG. 22 is a schematic view of a portion of a conveyor belt according to another exemplary disclosed embodiment.

FIG. 22 is a schematic view of a portion of a conveyor belt 2200. Conveyor belt 2200 is formed of a plurality of connecting rods 2220 connecting wire spirals of a spiral overlay 2225. As shown in FIG. 22, spiral overlay 2225 includes a first arcuate linking bend 2230 and a second arcuate linking bend 2235 opposing first arcuate linking bend 2230. In addition, spiral overlay 2225 includes an intermediate loop 2238. Intermediate loop 2238 includes opposed arcuate linking bends including a first arcuate linking bend 2240 configured to extend around a connecting rod of a conveyor belt and a second arcuate linking bend 2245 configured to be disposed between a first connecting rod 2221 and a second connecting rod 2222.

In some embodiments, opposed arcuate linking bends of the spiral overlay may span more than two connecting rods. In addition, the intermediate loops may also span across a connecting rod. Such configurations may provide longer lengths of wire spiral disposed as part of the conveying surface.

Figure 23:
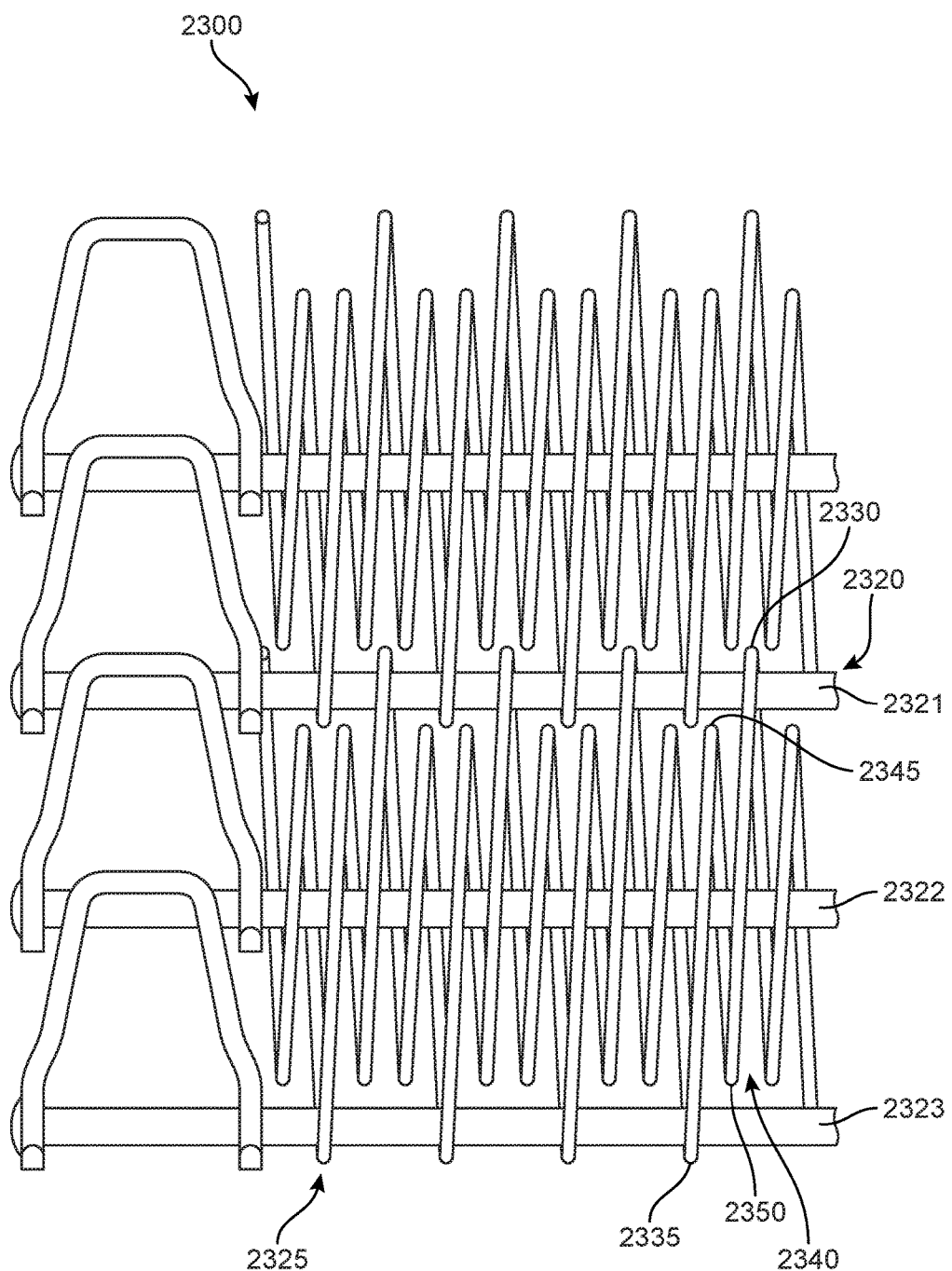
FIG. 23 is a schematic view of a portion of a conveyor belt according to another exemplary disclosed embodiment.

FIG. 23 is a schematic view of a portion of a conveyor belt 2300. Conveyor belt 2300 is formed of a plurality of connecting rods 2320 connecting wire spirals of a spiral overlay 2325. As shown in FIG. 23, connecting rods 2320 include a first connecting rod 2321, a second connecting rod 2322, and a third connecting rod 2323. Spiral overlay 2325 includes a first arcuate linking bend 2330 and a second arcuate linking bend 2335 opposite first arcuate linking bend 2330. As shown in FIG. 23, opposing arcuate linking bends 2330 and 2335 span three connecting rods, including first connecting rod 2321, second connecting rod 2322, and third connecting rod 2323. Also, spiral overlay 2325 includes an intermediate loop 2340. Intermediate loop 2340 includes a first arcuate linking bend 2345 and an opposing second arcuate linking bend 2350. As shown in FIG. 23, first arcuate linking bend 2345 and opposing second arcuate linking bend 2350 span across second connecting rod 2322.

In some embodiments, a rod or other structure can be disposed through the intermediate loops. This may fill space in between the connecting rods to prevent items from falling through the belt.

Figure 24:
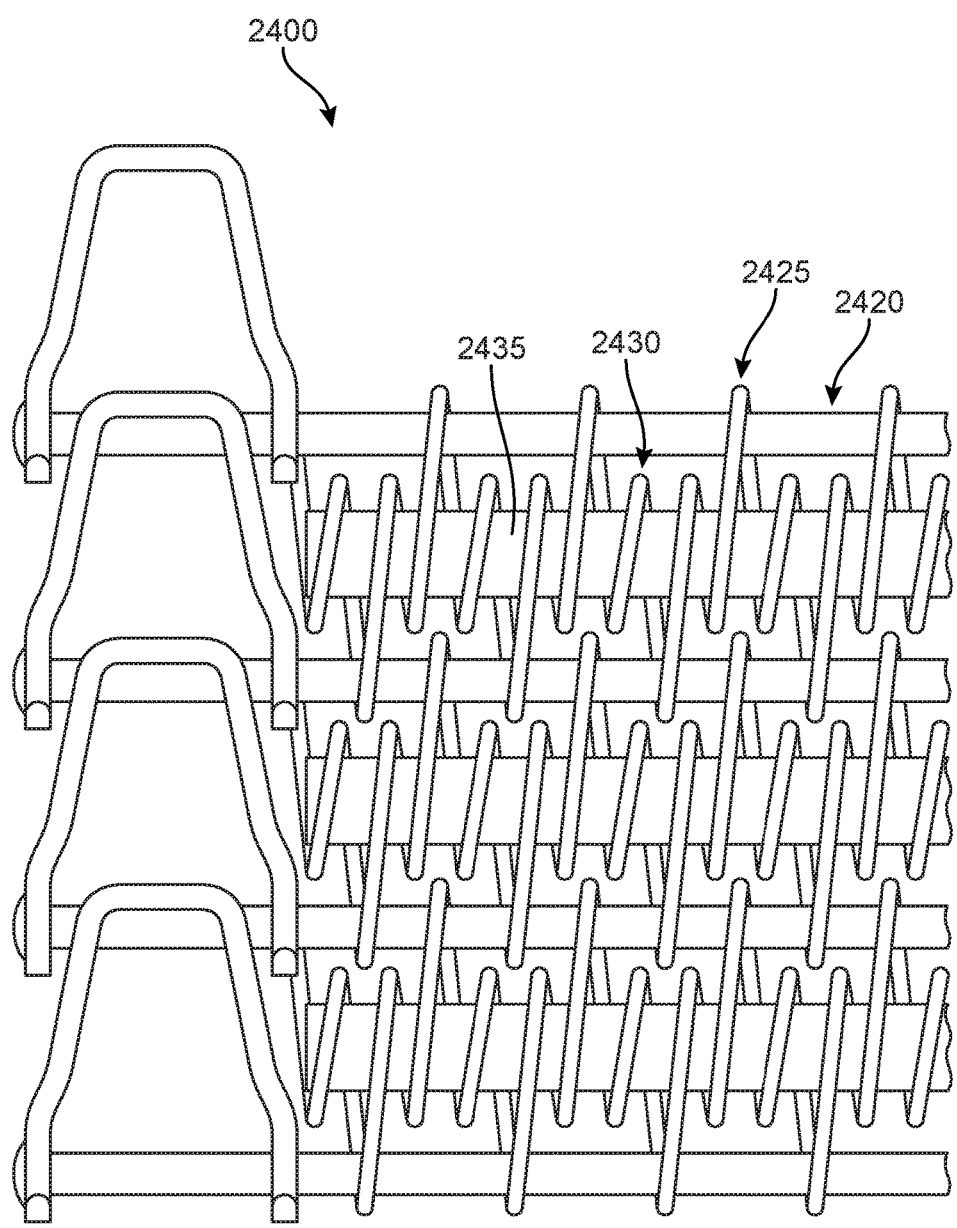
FIG. 24 is a schematic view of a portion of a conveyor belt according to another exemplary disclosed embodiment.

FIG. 24 is a schematic view of a portion of a conveyor belt 2400. Conveyor belt 2400 is formed of a plurality of connecting rods 2420 connecting wire spirals of a spiral overlay 2425. Spiral overlay 2425 includes a plurality of intermediate loops 2430 spaced laterally across conveyor belt 2400. As shown in FIG. 24, an elongate rod 2435 is disposed within laterally spaced intermediate loops 2430.

In some embodiments, the spiral overlay may have a unilateral weave or a balanced weave. For example, FIG. 24 illustrates a unilateral weave. That is, all of the portions of the spirals on the conveying surface are angled the same way, and all of the portions of the spirals on the opposing (lower) surface of the belt are angled the opposite way.

In other embodiments, a balanced weave may be provided where alternating spirals of the spiral overlay are oriented at opposing angles. That is, the plurality of wire spirals forming the spiral overlay includes a first set of spirals and a second set of spirals, wherein the first set of spirals the second set of spirals are arranged in an alternating fashion. In addition, the first set of spirals includes wire segments in the conveying surface that are oriented in a first non-zero angle with respect to the longitudinal axis of the belt. Also, the second set of spirals includes wire segments in the conveying surface that are oriented in a second non-zero angle with respect to the longitudinal axis. The second non-zero angle may be opposite the first non-zero angle.

This resembles a herringbone pattern and may prevent cargo on the belt from "walking" laterally toward one edge of the belt.

Figure 25:
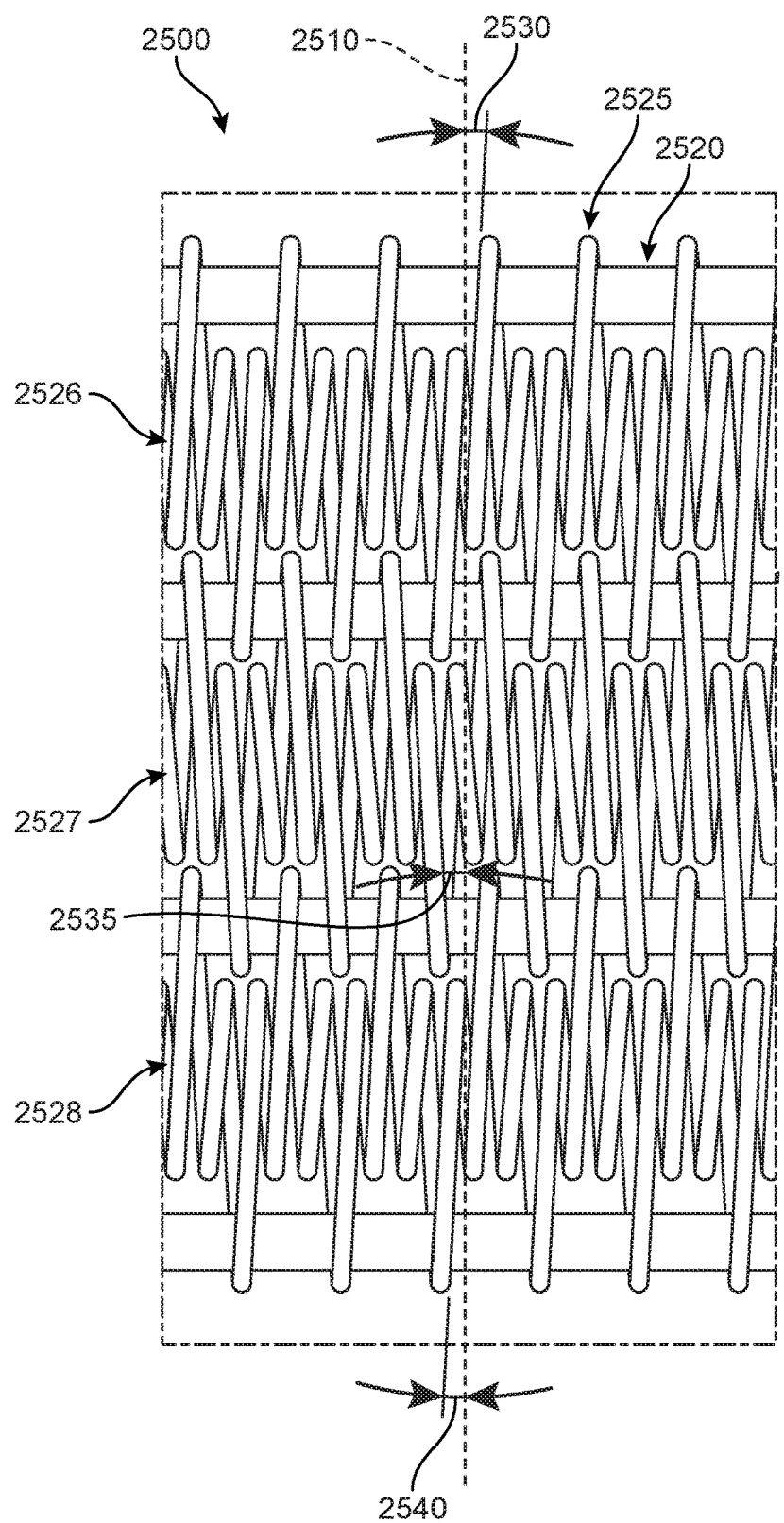
FIG. 25 is a schematic view of a portion of a conveyor belt according to another exemplary disclosed embodiment.

FIG. 25 is a schematic view of a portion of a conveyor belt 2500. Conveyor belt 2500 is formed of a plurality of connecting rods 2520 connecting wire spirals of a spiral overlay 2525. A longitudinal axis 2510 indicates the conveying direction of conveyor belt 2500.

Spiral overlay 2525 of conveyor belt 2500 has a balanced weave. As shown in FIG. 25, spiral overlay 2525 includes a first spiral 2526, a second spiral 2527, and a third spiral 2528. First spiral 2526 may be oriented at a first non-zero angle 2530 with respect to longitudinal axis 2510. Second spiral 2527 may be oriented at a second non-zero angle 2535 with respect to longitudinal axis 2510. Second non-zero angle 2535 is illustrated as opposite first non-zero angle 2530. In FIG. 25, first non-zero angle 2530 and second non-zero angle 2535 are illustrated as being equal and opposite. However, in some embodiments, these angles need not necessarily be of equal magnitude.

In addition, third spiral 2528 is oriented at a third non-zero angle 2540 with respect to longitudinal axis 2510. As shown in FIG. 25, third non-zero angle 2540 is substantially the same as first non-zero angle 2530. Thus, the three spirals have an alternating arrangement with respect to the angle at which they are oriented with respect to longitudinal axis 2510.

In some embodiments different wire spirals of a spiral overlay may have different gauges. For example, by utilizing smaller gauge wire spirals interspersed among larger gauge wire spirals, weight can be saved without significantly sacrificing strength.

Figure 26:
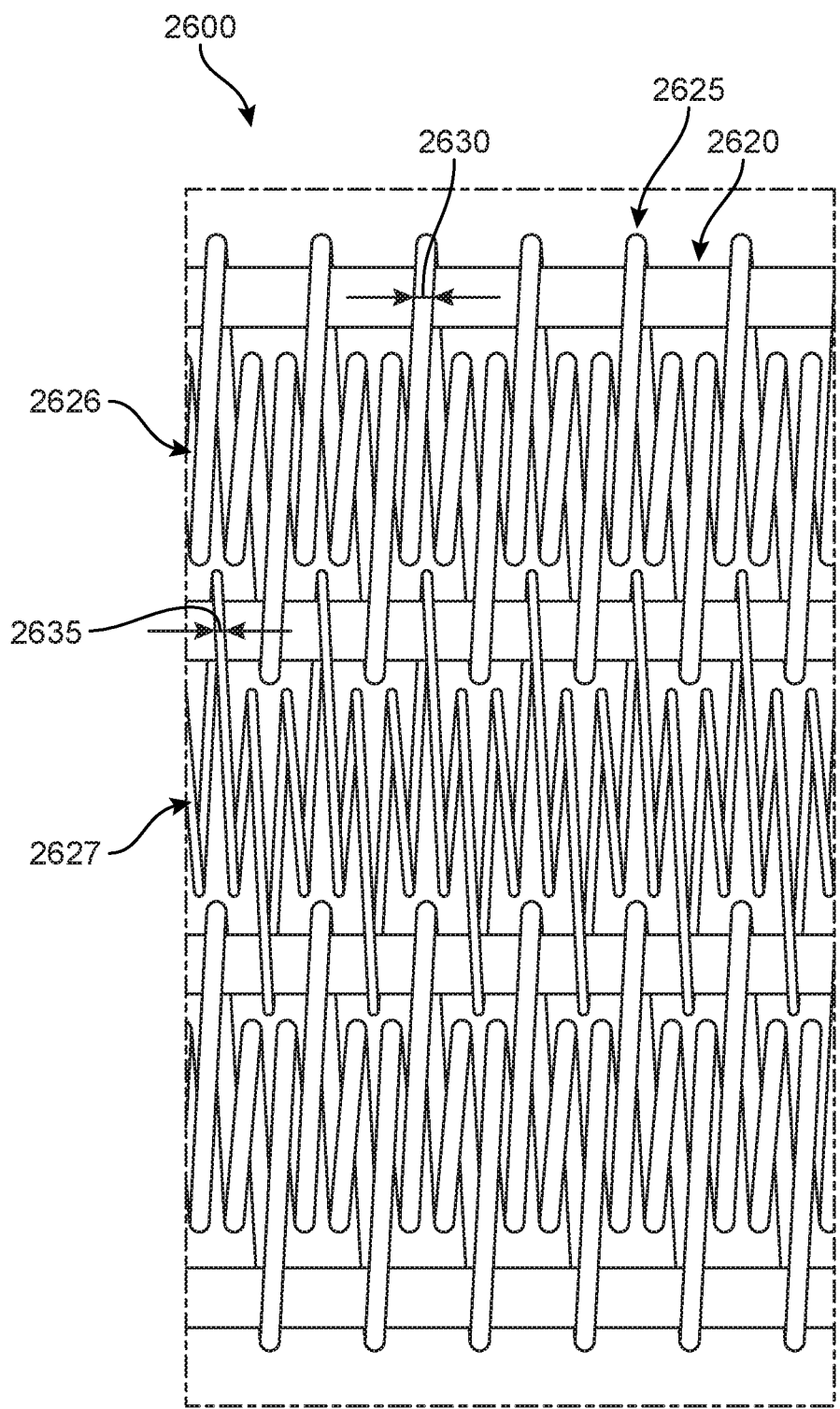
FIG. 26 is a schematic view of a portion of a conveyor belt according to another exemplary disclosed embodiment.

FIG. 26 is a schematic view of a portion of a conveyor belt 2600. Conveyor belt 2600 is formed of a plurality of connecting rods 2620 connecting wire spirals of a spiral overlay 2625. Spiral overlay 2625 includes a plurality of wire spirals including at least a first wire spiral 2626 formed of a wire having a first gauge and at least a second wire spiral 2627 formed of a wire having a second gauge, wherein the second gauge is different than the first gauge. First wire spiral 2626 has a first thickness 2630 and second wire spiral 2627 has a second thickness 2635. As shown in FIG. 26, first thickness 2630 is larger than second thickness 2635.

Further variations on the embodiments discussed above are also possible. It will be noted that, in some embodiments, such as those discussed herein, the belts may have vertical and lateral symmetry. Accordingly, such belts can be flipped over and the opposing surface can become the conveying surface. This helps prolong the life of the belt. In other embodiments, the belt may be asymmetrical in the vertical direction and/or the lateral direction.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A spiral overlay for a conveyor belt having a lateral axis extending across the belt defining a lateral direction, a longitudinal axis extending along a conveying direction of the belt, and a vertical axis perpendicular to the lateral axis and the longitudinal axis, the vertical axis defining a vertical direction, the conveyor belt formed of a plurality of connecting rods extending laterally across the belt, said overlay comprising:
   a plurality of wire spirals assembled together in intermeshing relationship to one another on the connecting rods to provide a conveying surface and an opposing surface with a belt thickness extending in the vertical direction;
   each of said wire spirals formed of a single length of wire and forming a helix extending laterally across the belt, said spiral comprising opposed arcuate linking bends at a forward end and a rearward end along the longitudinal axis, and at least one intermediate loop formed between said opposed arcuate linking bends and disposed within the belt thickness, said spirals arranged relative to one another such that said linking bends of one spiral are intermeshed with linking bends of an immediately adjacent one of said spirals and said intermeshed linking bends of adjacent spirals are adapted to receive one of the connecting rods to operatively connect said spirals.

2. The spiral overlay of claim 1, wherein said intermediate loop is formed between a forward arcuate linking bend and a rearward arcuate linking bend of said spiral.

3. The spiral overlay of claim 1, wherein said wire spiral comprises a first plurality of intermediate loops formed between at least a first set of opposed arcuate linking bends, said first plurality of intermediate loops disposed within the belt thickness.

4. The spiral overlay of claim 3, wherein said wire spiral comprises a second plurality of intermediate loops formed between at least a second set of opposed arcuate linking bends, both said loops disposed within the belt thickness; and
   wherein the second plurality of intermediate loops consists of a different number of intermediate loops than the first plurality of intermediate loops.

5. The spiral overlay of claim 1, wherein said spiral overlay comprises a first set of forward arcuate linking bends adjacent one another and a second set of forward arcuate linking bends adjacent one another; and
   wherein the at least one intermediate loop is disposed laterally between the first set of forward arcuate linking bends and the second set of forward arcuate linking bends.

6. The spiral overlay of claim 1, wherein the at least one intermediate loop is provided in a portion of the spiral overlay configured to be disposed proximate a lateral edge of a conveyor belt; and
   wherein a central portion of the spiral overlay configured to form a substantial majority of a width of a conveyor belt is formed without intermediate loops between arcuate linking bends of the spiral.

7. The spiral overlay of claim 1, wherein the at least one intermediate loop is provided in a central portion of the spiral overlay configured to be disposed in a central region of a conveyor belt; and
   wherein a lateral portion of the spiral overlay configured to form a lateral edge portion of a conveyor belt is formed without intermediate loops between arcuate linking bends of the spiral.

8. The spiral overlay of claim 1, wherein the at least one intermediate loop includes a plurality of intermediate loops having varying lengths in the conveying direction; and
   wherein intermediate loops that are disposed in a lateral portion of the spiral overlay configured to be disposed proximate a lateral edge of a conveyor belt have shorter lengths in the conveying direction than intermediate loops located in a central portion of the spiral overlay.

9. The spiral overlay of claim 1, wherein the at least one intermediate loop includes a plurality of intermediate loops having varying lengths in the conveying direction;
   wherein the distances between opposed arcuate linking bends in the conveying direction are shorter in a lateral portion of the spiral overlay than in a central portion of the spiral overlay.

10. The spiral overlay of claim 1, wherein the at least one intermediate loop includes opposed arcuate linking bends including a first arcuate linking bend configured to extend around a connecting rod of a conveyor belt.

11. The spiral overlay of claim 1, wherein the opposed arcuate linking bends of the spiral are configured to span three connecting rods of a conveyor belt; and
   wherein the at least one intermediate loop is configured to span a single connecting rod of a conveyor belt.

12. The spiral overlay of claim 1, wherein the at least one intermediate loop includes one or more intermediate loops having a substantially oval shape.

13. The spiral overlay of claim 1, wherein the at least one intermediate loop includes one or more intermediate loops having a substantially rectangular shape.

14. The spiral overlay of claim 1, further including at least one intermediate loop formed between said opposed arcuate linking bends and having an upstanding portion configured to extend above the conveying surface.

15. The spiral overlay of claim 1, wherein the intermediate loop is configured to limit longitudinal collapse of the belt by maintaining a predetermined minimum spacing between adjacent connecting rods.

16. The spiral overlay of claim 1, wherein the length of wire including the intermediate loop is configured to form a portion of the conveying surface that is discontinuous at the intermediate loop.

17. The spiral overlay of claim 1, wherein the length of wire includes first portions that extend in the first plane and second portions that extend in the second plane;
wherein the first portions of the at least one wire each extend at a non-zero angle with respect to the longitudinal axis.

18. The spiral overlay of claim 17, wherein the second portions of the at least one wire extend in a longitudinal direction.

19. A spiral overlay for a conveyor belt formed of a plurality of connecting rods extending laterally across the belt, the belt having a conveying surface and an opposing surface, said spiral overlay comprising:
a plurality of wire spirals, each formed of a single length of wire and forming a helix configured to extend across the belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals adapted to receive one of the rods to operatively connect said spirals; and
wherein the plurality of wire spirals are configured in a first plane to define the conveying surface of the belt and configured in a second plane to define the opposing surface of the belt substantially parallel to the first plane, wherein the distance between the first plane and the second plane defines a vertical thickness of the spiral overlay;
wherein a belt space includes the first plane, the second plane, and the space between the first plane and the second plane;
wherein at least one wire forming the spiral overlay includes an intermediate loop between the opposed arcuate linking bends; and
wherein the entire intermediate loop is disposed within the belt space.

20. The spiral overlay of claim 19, wherein the intermediate loop is configured to limit longitudinal collapse of the belt by maintaining a minimum spacing between adjacent connecting rods.

21. The spiral overlay of claim 19, wherein the at least one wire including the intermediate loop is configured to form a portion of the conveying surface that is discontinuous at the intermediate loop.

22. The spiral overlay of claim 21, wherein the at least one wire is configured to form two portions of the conveying surface having a gap between them; and
wherein the two portions of the conveying surface are offset laterally from one another by a distance that is greater than a thickness of the at least one wire.

23. The spiral overlay of claim 19, wherein the at least one wire includes first portions that extend in the first plane and second portions that extend in the second plane; and
wherein the first portions of the at least one wire each extend at a non-zero angle with respect to the longitudinal axis.

24. The spiral overlay of claim 23, wherein the second portions of the at least one wire extend in a longitudinal direction.

25. The spiral overlay of claim 19, wherein the at least one wire includes portions that extend in the first plane and portions that extend in the second plane; and
wherein the portions that extend in the first plane are continuous; and
wherein the portions that extend in the second plane are discontinuous at intermediate loops disposed between the opposed arcuate linking bends.

26. A conveyor belt having a lateral axis extending across the belt and defining a lateral direction, a longitudinal axis in a conveying direction of the belt, and a vertical axis perpendicular to the lateral axis and the longitudinal axis and defining a vertical direction, the conveyor belt comprising:
a plurality of connecting rods extending laterally across the belt;
a spiral overlay including a plurality of wire spirals, each formed of a single length of wire and forming a helix extending across the belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals adapted to receive one of the rods to operatively connect said spirals; and
wherein the plurality of wire spirals define a conveying surface and an opposing surface of the belt;
wherein the conveying surface extends in a first plane and the opposing surface extends in a second plane substantially parallel to the first plane, wherein the distance between the first plane and the second plane defines a thickness of the spiral overlay;
wherein at least one wire forming the spiral overlay includes at least one intermediate loop between two of the opposed arcuate linking bends; and
wherein the at least one intermediate loop is coiled about a central axis that is substantially parallel to the first plane;
wherein the at least one intermediate loop has a first edge and an opposing second edge oriented opposite one another in the vertical direction; and
wherein the first edge of the at least one intermediate loop is disposed in the first plane.

27. The conveyor belt of claim 26, wherein the opposing second edge of the at least one intermediate loop is disposed in the second plane such that the at least one intermediate loop has a height that is substantially the same as the thickness of the spiral overlay.

28. The conveyor belt of claim 27, wherein the at least one wire includes first portions that extend in the first plane and second portions that extend in the second plane; and
wherein the first portions of the at least one wire each extend at a non-zero angle with respect to the longitudinal axis.

29. The conveyor belt of claim 28, wherein the second portions of the at least one wire extend in a longitudinal direction.

30. The conveyor belt of claim 27, wherein the at least one wire includes portions that extend in the first plane and portions that extend in the second plane; and wherein the portions that extend in the first plane are continuous; and wherein the portions that extend in the second plane are discontinuous at intermediate loops disposed between the opposed arcuate linking bends.

31. The conveyor belt of claim 26, wherein the at least one intermediate loop is configured to limit longitudinal collapse of the belt by maintaining a predetermined minimum spacing between adjacent connecting rods.

32. The conveyor belt of claim 26, wherein the at least one wire including the at least one intermediate loop is configured to form a portion of the conveying surface that is discontinuous at the intermediate loop.

33. The conveyor belt of claim 32, wherein the at least one wire is configured to form two portions of the conveying surface having a gap between them; and wherein the two portions of the conveying surface are offset laterally from one another by a distance that is greater than a thickness of the at least one wire.

34. The conveyor belt of claim 26, wherein the at least one intermediate loop includes a plurality of intermediate loops spaced laterally across the belt;

wherein the conveyor belt further includes an elongate rod disposed within the laterally spaced intermediate loops.

35. The conveyor belt of claim 26, wherein the plurality of wire spirals includes a first set of spirals and a second set of spirals, wherein the first set of spirals the second set of spirals are arranged in an alternating fashion;

wherein the first set of spirals includes wire segments in the conveying surface that are oriented in a first non-zero angle with respect to the longitudinal axis;

wherein the second set of spirals includes wire segments in the conveying surface that are oriented in a second non-zero angle with respect to the longitudinal axis; and wherein the second non-zero angle is opposite the first non-zero angle.

36. The conveyor belt of claim 26, wherein the plurality of wire spirals includes at least a first wire spiral formed of a wire having a first gauge and at least a second wire spiral formed of a wire having a second gauge, wherein the second gauge is larger than the first gauge.

\* \* \* \* \*